US008230077B2

(12) United States Patent
Anderson et al.

(10) Patent No.: US 8,230,077 B2
(45) Date of Patent: Jul. 24, 2012

(54) HYPERVISOR-BASED FACILITY FOR COMMUNICATING BETWEEN A HARDWARE MANAGEMENT CONSOLE AND A LOGICAL PARTITION

(75) Inventors: Gary D. Anderson, Austin, TX (US); Curtis S. Eide, Rochester, MN (US); Jonathan L. Kaus, Rochester, MN (US); Steven E. Royer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 12/403,402

(22) Filed: Mar. 13, 2009

(65) Prior Publication Data

US 2009/0307713 A1    Dec. 10, 2009

Related U.S. Application Data

(60) Provisional application No. 61/059,492, filed on Jun. 6, 2008.

(51) Int. Cl.
*G06F 15/16* (2006.01)
(52) U.S. Cl. ...................................... 709/227
(58) Field of Classification Search .................. 709/227
See application file for complete search history.

(56) References Cited

U.S. PATENT DOCUMENTS

| 5,909,540 | A | 6/1999 | Carter et al. |
| RE36,462 | E | 12/1999 | Chang et al. |
| 6,769,017 | B1 | 7/2004 | Bhat et al. |
| 6,976,137 | B2 | 12/2005 | Ouren et al. |
| 7,305,592 | B2 | 12/2007 | Neiger et al. |
| 7,337,296 | B2 | 2/2008 | Noel et al. |
| 7,506,095 | B2 | 3/2009 | Otte et al. |
| 7,680,754 | B2 | 3/2010 | Hillier |
| 7,698,531 | B2 | 4/2010 | Flemming et al. |
| 7,702,843 | B1 | 4/2010 | Chen et al. |
| 7,849,347 | B2 | 12/2010 | Armstrong et al. |
| 8,046,641 | B2 | 10/2011 | Hernandez et al. |
| 2002/0010844 | A1 | 1/2002 | Noel et al. |
| 2002/0087611 | A1 | 7/2002 | Tanaka et al. |
| 2002/0138704 | A1 | 9/2002 | Hiser et al. |
| 2003/0084372 | A1 | 5/2003 | Mock et al. |
| 2004/0139287 | A1 | 7/2004 | Foster et al. |

(Continued)

OTHER PUBLICATIONS

IBM International Technical Support Organization. "HiperSockets Implementation Guide". Mar. 2007. pp. 1-132.*

(Continued)

*Primary Examiner* — John Macilwinen
(74) *Attorney, Agent, or Firm* — Heslin Rothenberg Farley & Mesiti, P.C.

(57) ABSTRACT

A hypervisor-based facility is provided for communicating between a hardware management console (HMC) and a logical partition of a data processing system. The facility includes: packaging a request or response of a source endpoint as cargo in a generic transport primitive, the source endpoint being either an HMC or a logical partition of the data processing system; and forwarding the generic transport primitive from the source endpoint to a target endpoint via the hypervisor. The forwarding includes receiving the transport primitive at the hypervisor and forwarding the cargo of the transport primitive to the target endpoint. The cargo includes the request or response from the source endpoint, and the hypervisor forwards the cargo absent inspection or parsing of that cargo. The target endpoint is the other one of the logical partition or the hardware management console of the data processing system.

20 Claims, 14 Drawing Sheets

U.S. PATENT DOCUMENTS

| | | |
|---|---|---|
| 2004/0193861 A1 | 9/2004 | Michaelis |
| 2004/0199599 A1 | 10/2004 | Nichols et al. |
| 2005/0071446 A1* | 3/2005 | Graham et al. ............... 709/223 |
| 2005/0132249 A1 | 6/2005 | Burton et al. |
| 2005/0160151 A1 | 7/2005 | Rawson, III |
| 2005/0240932 A1 | 10/2005 | Billau et al. |
| 2005/0278719 A1 | 12/2005 | Togawa |
| 2006/0075207 A1 | 4/2006 | Togawa et al. |
| 2006/0101224 A1 | 5/2006 | Shah et al. |
| 2006/0123217 A1* | 6/2006 | Burdick et al. ............... 711/173 |
| 2006/0146057 A1 | 7/2006 | Blythe |
| 2006/0195673 A1 | 8/2006 | Arndt et al. |
| 2006/0236059 A1 | 10/2006 | Fleming et al. |
| 2007/0061441 A1 | 3/2007 | Landis et al. |
| 2007/0112999 A1 | 5/2007 | Oney et al. |
| 2007/0168635 A1 | 7/2007 | Allen et al. |
| 2007/0210650 A1 | 9/2007 | Togashi |
| 2007/0299990 A1 | 12/2007 | Ben-Yehuda et al. |
| 2008/0040565 A1 | 2/2008 | Rozas et al. |
| 2008/0071755 A1 | 3/2008 | Barsness et al. |
| 2008/0082696 A1 | 4/2008 | Bestler |
| 2008/0082975 A1 | 4/2008 | Oney et al. |
| 2008/0183996 A1 | 7/2008 | Field et al. |
| 2008/0256321 A1 | 10/2008 | Armstrong et al. |
| 2008/0256327 A1 | 10/2008 | Jacobs et al. |
| 2008/0256530 A1 | 10/2008 | Armstrong et al. |
| 2009/0100237 A1 | 4/2009 | Orikasa et al. |
| 2009/0144510 A1 | 6/2009 | Wibling et al. |
| 2009/0307436 A1 | 12/2009 | Larson et al. |
| 2009/0307438 A1 | 12/2009 | Logan et al. |
| 2009/0307439 A1 | 12/2009 | Jacobs et al. |
| 2009/0307440 A1 | 12/2009 | Jacobs et al. |
| 2009/0307441 A1 | 12/2009 | Hepkin et al. |
| 2009/0307445 A1 | 12/2009 | Jacobs et al. |
| 2009/0307447 A1 | 12/2009 | Jacobs et al. |
| 2009/0307688 A1 | 12/2009 | Pafumi et al. |
| 2009/0307690 A1 | 12/2009 | Logan et al. |
| 2009/0307713 A1 | 12/2009 | Anderson et al. |

OTHER PUBLICATIONS

Valdez, E. et al. Retrofitting the IBM Power Hypervisor to Support Mandatory Access Control. 23 Annual Computer Security Applications Conference. 2007. pp. 221-230.*

Office Action for U.S. Appl. No. 121403,408 (Application No. US-2009-0307436-A1) dated Jul. 15, 2011.

Office Action for U.S. Appl. No. 12/403,472 (U.S. Application Publication No. 2009-0307441 Al) dated Sep. 22, 2011.

Jacob Faber Kloster et al. "Efficient Memory Sharing in the Xen Virtual Machine Monitor." Jan. 2006. Department of Computer Science, Aalborg University.

Carl A. Waldspurger. "Memory Resource Management in VMware ESX Server." Dec. 2002. ACM. OSDI'02.

Lawson et al., "Controlling Access to Physical Indicators in a Logically Partitioned Computer System", U.S. Appl. No. 12/238,757, filed Sep. 26, 2008.

Lawson et al., "Managing Condition Indicators that Use the Same Physical Indicator Device in a Computer System", U.S. Appl. No: 12/238,776, filed Sep. 26, 2008.

Office Action for U.S. Appl. No. 121403,485 (U.S. Patent Publication No. 2009/0307447 Al ), dated Apr. 28, 2011.

Office Action for U.S. Appl. No. 12/403,447 (U.S. Patent Publication No. 2009/0307440 Al), dated May 11, 2011.

Hernandez et al., Office Action for U.S. Appl. No. 12/478,990 (U.S. Letters Patent No. 8,046,641 B2), dated Jan. 19, 2011.

Logan et al, Office Action for U.S. Appl. No. 12/403,426, filed Mar. 13, 2009 (U.S. Patent Publication No. 2009/0307438 Al), dated May 26, 2011.

Hernandez et al., Notice of Allowance for U.S. Appl. No. 12/478,990 (U.S. Letters Patent No. 8,046,641 B2), dated Jun. 20, 2011.

Jacobs et al., Office Action for U.S. Appl. No. 12/403,485, filed Mar. 13, 2009 (U.S. Patent Publication No. 2009/0307447 Al), dated Oct. 7, 2011.

Jacobs et al., Notice of Allowance for U.S. Appl. No. 12/403,447, filed Mar. 13, 2009 (U.S. Patent Publication No. 2009/0307440 Al), dated Oct. 18, 2011.

Jacobs et al., Office Action for U.S. Appl. No. 12/403,440, filed Mar. 13, 2009 (U.S. Patent Publication No. 2009/0307439 Al), dated Oct. 27, 2011.

Logan et al, Notice of Allowance for U.S. Appl. No. 12/403,426, filed Mar. 13, 2009 (U.S. Patent Publication No. 2009/0307438 Al), dated Nov. 7, 2011.

Larson et al., Notice of Allowance for U.S. Appl. No. 12/403,408, filed Mar. 13, 2009 (U.S. Patent Publication No. 2009/0307436 Al), dated Dec. 19, 2011.

Jacobs et al., Notice of Allowance for U.S. Appl. No. 12/403,485, filed Mar. 13, 2009 (U.S. Patent Publication No. 2009/0307447 Al), dated Dec. 30, 2011.

Hepkin et al., Notice of Allowance for U.S. Appl. No. 12/403,472, filed Mar. 13, 2009 (U.S. Patent Publication No. 2009/0307441 Al), dated Jan. 27, 2012.

* cited by examiner

HYPERVISOR-BASED FACILITY FOR COMMUNICATING BETWEEN A HARDWARE MANAGEMENT CONSOLE AND A LOGICAL PARTITION

CROSS-REFERENCE TO RELATED APPLICATION

This application claims the benefit of U.S. provisional application Ser. No. 61/059,492, filed Jun. 6, 2008, entitled "Virtual Real Memory", the entirety of which is incorporated herein by reference.

TECHNICAL FIELD

The present invention relates generally to data processing systems, and more particularly, to a hypervisor-based, general purpose communications facility between hardware management consoles and logical partitions of a logically partitioned data processing system.

BACKGROUND OF THE INVENTION

One recent development in the management of complex computer system resources is the logical partitioning of system resources. Conceptually, logical partitioning means that multiple discrete partitions are established, and the system resources of certain types are assigned to respective partitions. For example, processor resources of a multi-processor system may be partitioned by assigning different processors to different partitions, by sharing processors among some partitions and not others, by specifying the amount of processing resource measure available to each partition which is sharing a set of processors, etc. Tasks executing within a logical partition can only use the resources assigned to that partition, and not resources assigned to another partition.

Generally, logical partitioning is enforced by a partition manager embodied as low-level, encoded executable instructions and data, although there may be a certain amount of hardware support for logical partitioning, such as special hardware registers which hold state information. The low-level code function and/or hardware prevent access to resources allocated to different partitions. Generally, some portion of the logical partition manager includes a user interface for managing the low-level code function than enforces logical partitioning. This logical partition manager interface is intended for use by a single or a small group of authorized users, that is, the system administrator(s). As used herein, this low-level logic partitioning code is referred to as the hypervisor, and a partition manager interface is referred to as the hardware management console (HMC). Communications between the HMC and the logical partitions of the data processing system may be desirable for, for example, concurrent hardware maintenance, dynamic logical partitioning, inventory collection, virtual input/output (I/O) device mappings, etc.

One communications approach between an HMC and the logical partitions of a data processing system utilizes the resource monitoring and control (RMC) based facility used for communications between HMCs and PAPR (Power Architecture Platform Requirements), i.e., AIX® and LINUX partitions. (AIX® is a registered trademark of International Business Machines Corporation, Armonk, N.Y., U.S.A. Other names used herein may be registered trademarks, trademarks, or product names of International Business Machines Corporation or other companies.) Unfortunately, the RMC solution requires real LAN connections between the HMC and the partitions. Associated with a real LAN connection are additional hardware requirements (LAN adapters and cabling), additional configuration tasks (network administration), and additional points of potential failure (LAN connections).

SUMMARY OF THE INVENTION

Provided herein, in one aspect, is a computer-implemented method of communicating between a hardware management console and a logical partition of a logically partitioned data processing system. The method includes: packaging by a source endpoint a request or a response of the source endpoint as cargo in a generic transport primitive, the source endpoint being one of a hardware management console or a logical partition of the data processing system, wherein the hardware management console is a user interface for partition management; and forwarding the generic transport primitive from the source endpoint to a target endpoint via a hypervisor of the data processing system, wherein the hypervisor receives the generic transport primitive packaged at the source endpoint and forwards the cargo of the generic transport primitive to the target endpoint, the cargo comprising the request or the response, and wherein the receiving and the forwarding by the hypervisor are absent inspecting or parsing of the cargo by the hypervisor, and the target endpoint is the other one of the logical partition or the hardware management console of the data processing system.

In another aspect, a logically partitioned data processing system is provided. The logically partitioned data processing system includes at least one processor comprising at least one logical partition, at least one external hardware management console, and a hypervisor interfacing the at least one hardware management console and the at least one logical partition. Each hardware management console is a user interface for partition management. The hypervisor includes a communications facility for communicating between the at least one hardware management console and the at least one logical partition through the hypervisor. The communicating includes: packaging by a source endpoint a request or a response as cargo in a generic transport primitive, the source endpoint being a hardware management console of the at least one hardware management console or a logical partition of the at least one logical partition; and forwarding the generic transport primitive from the source endpoint to a target endpoint through the hypervisor, wherein the hypervisor receives the generic transport primitive packaged at the source endpoint and forwards the cargo of the generic transport primitive to the target endpoint, the cargo including the request or the response of the source endpoint, and wherein the receiving and forwarding by the hypervisor are absent inspecting or parsing of the cargo by the hypervisor, and the target endpoint is the other one of the logical partition of the at least one logical partition or the hardware management console of the at least one hardware management console.

In a further aspect, an article of manufacture is provided which includes at least one computer-readable medium having computer-readable program code logic to facilitate communication between a hardware management console and a logical partition of a logically partitioned data processing system. The computer-readable program code logic when executing on a processor performing: packaging by a source endpoint a request or a response of the source endpoint as cargo in a generic transport primitive, the source endpoint being one of a hardware management console or a logical partition of the data processing system, wherein the hardware management console is a user interface for partition management; and forwarding the generic transport primitive from the source endpoint to a target endpoint via a hypervisor of the data processing system, wherein the hypervisor receives the generic transport primitive packaged at the source endpoint and forwards the cargo of the generic transport primitive to the target endpoint, the cargo comprising the request or the response of the source endpoint, and wherein the receiving and the forwarding by the hypervisor are absent inspecting or parsing of the cargo by the hypervisor, and the target endpoint is the other one of the logical partition or the hardware management console of the data processing system.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
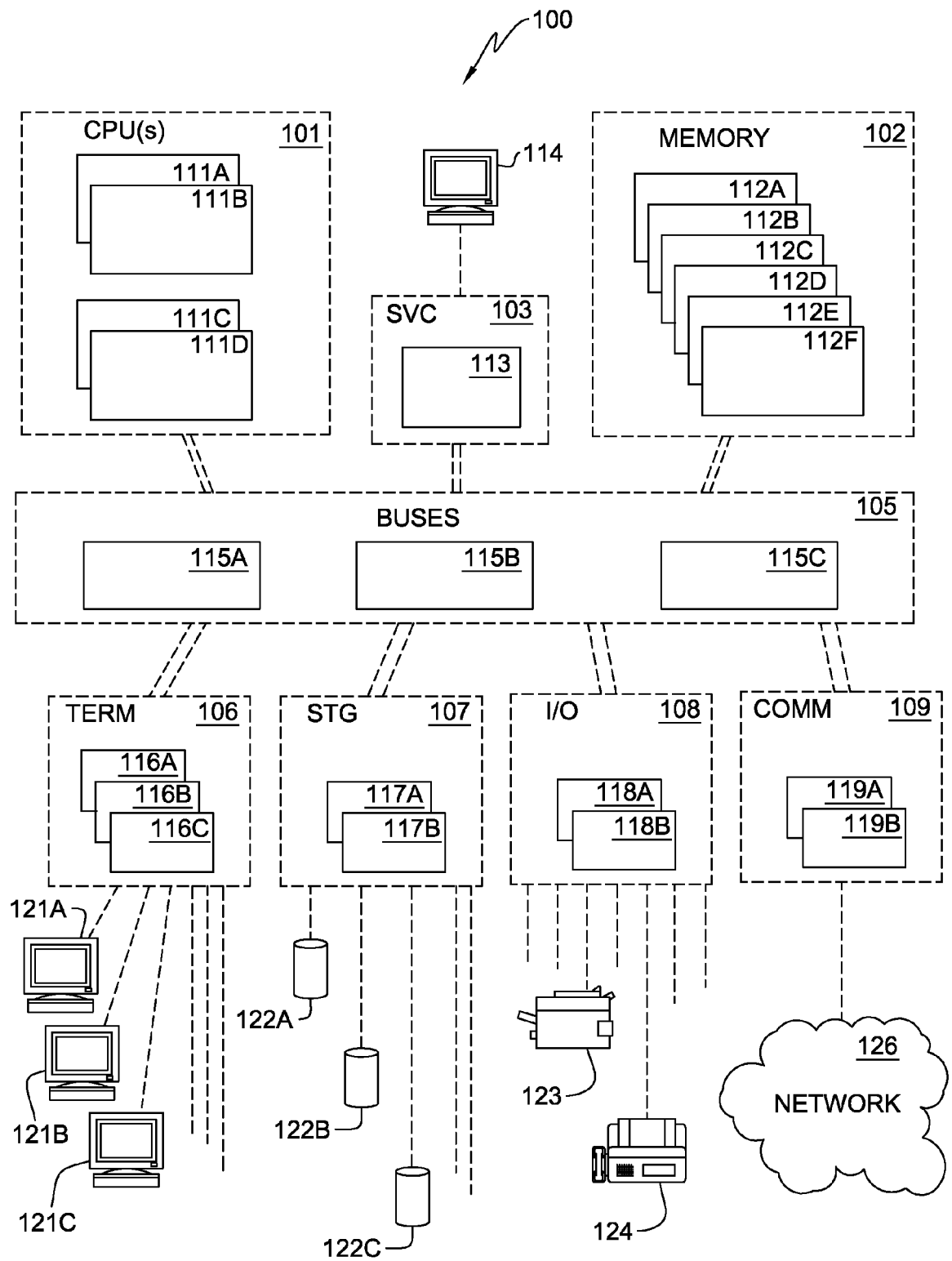
FIG. 1 is a high-level block diagram of various hardware components of a logically partitioned data processing system, in accordance with an aspect of the present invention.

Logical partitioning is a technique for dividing a single large computer system into multiple partitions, each of which behaves in some respects as a separate computer system. Computer system resources may be allocated in any of various ways for use by the partitions. A given resource may be allocated for exclusive use by a single partition, or may be shared among all partitions (or some subgroup of partitions) on a time interleaved or other basis. Some resources may be allocated to respective particular partitions, while others are shared. Examples of resources which may be partitioned are central processors, main memory, I/O processors and adapters, and I/O devices. Each user task executing in a logically partitioned computer system is assigned to one of the logical partitions ("executes in the partition"), meaning that it can use only the system resources or share of resources assigned to that partition, and not resources assigned to other partitions.

Logical partitioning is indeed logical rather than physical. A general purpose computer typically has physical data connections such as buses running among different hardware components, allowing them to communicate with one another. These hardware resources may be shared by and/or allocated to different partitions. From a physical configuration standpoint, there is typically no distinction made with regard to logical partitions. Generally, logical partitioning is enforced by a partition manager embodied as low-level encoded executable instructions and data, although there may be a certain amount of hardware support for logical partitioning, such as special hardware registers which hold state information. The system's physical devices and subcomponents thereof are typically physically connected to allow communication without regard to logical partitions, and from this hardware standpoint, there is nothing which prevents a task executing in partition A from writing to memory or an I/O device allocated to partition B. The low level code function and/or hardware prevent access to the resources allocated to other partitions.

Code enforcement of logical partitioning constraints generally means that it is possible to alter the logical configuration of a logically partitioned computer system, i.e., to change the number of logical partitions or re-assign resources to different partitions, without reconfiguring hardware. Generally, some portion of the logical partition manager comprises a user interface for managing the low-level code function that enforces logical partitioning. This logical partition manager interface is intended for use by a single or a small group of authorized users, who are herein designated the system administrator. As used herein, this low-level logical partitioning code is referred to as the "hypervisor", and a partition manager interface is referred to as the "hardware management console".

Logical partitioning of a large computer system has several potential advantages. As noted above, it is flexible in that reconfiguration and re-allocation of resources is easily accomplished without changing hardware. It isolates tasks or groups of tasks, helping to prevent any one task or group of tasks from monopolizing system resources. It facilitates the regulation of resources provided to particular users; this is important where the computer system is owned by a service provider which provides computer service to different users on a fee-per-resource-used basis. It may enable a single computer system to concurrently support multiple operating systems and/or environments, since each logical partition can be executing a different operating system or environment. Finally, isolation of tasks and resources makes it more difficult for a process executing in one partition to access resources in another partition, thus providing greater security and data integrity.

Referring to the figures, wherein like numbers denote like parts throughout the several views, FIG. 1 is a high-level representation of certain hardware components of a logically partitionable computer system 100 having multiple physical hardware components. At a functional level, the major components of system 100 are shown in FIG. 1 outlined in dashed lines; these components include one or more central processing units (CPU) 101, main memory 102, service processor 103, terminal interface 106, storage interface 107, other I/O device interface 108, and communications/network interfaces 109, all of which are coupled for inter-component communication via one or more buses 105.

CPU 101 is one or more general-purpose programmable processors, executing instructions stored in memory 102; system 100 may contain either a single CPU or multiple CPUs, either alternative being collectively represented by feature CPU 101 in FIG. 1, and may include one or more levels of on-board cache (not shown). Typically, a logically partitioned system will contain multiple CPUs. Memory 102 is a random-access semiconductor memory for storing data and programs. Memory 102 is conceptually a single monolithic entity, it being understood that memory is often arranged in a hierarchy of caches and other memory devices. Additionally, memory 102 may be divided into portions associated with particular CPUs or sets of CPUs and particular buses, as in any of various so-called non-uniform memory access (NUMA) computer system architectures.

Service processor 103 is a special-purpose functional unit used for initializing the system, maintenance, and other low-level functions. In general, it does not execute user application programs, as does CPU 101. In one embodiment, among other functions, service processor 103 and attached hardware management console (HMC) 114 provide an interface for a system administrator or similar individual, allowing that person to manage logical partitioning of system 100.

Terminal interface 106 provides a connection for the attachment of one or more user terminals 121A-C (referred to generally as 121), and may be implemented in a variety of ways. Many large server computer systems (mainframes) support the direct attachment of multiple terminals through terminal interface I/O processors, usually on one or more electronic circuit cards. Alternatively, interface 106 may provide a connection to a local area network to which terminals 121 are attached. Various other alternatives are possible. Data storage interface 107 provides an interface to one or more data storage devices 122A-C, (referred to generally as 122), which may be rotating magnetic hard disk drive units, although other types of data storage device could be used. I/O and other device interface 108 provides an interface to any of various other input/output devices or devices of other types. Two such devices, printer 123 and fax machine 124, are shown in the exemplary embodiment of FIG. 1, it being understood that many other such devices may exist, which may be of differing types. Communications interface 109 provides one or more communications paths from system 100 to other digital devices and computer systems; such paths may include, e.g., one or more networks 126 such as the Internet, local area networks, or other networks, or may include remote device communication lines, wireless connections, and so forth.

Buses 105 provide communication paths among the various system components. Although a single conceptual bus entity 105 is represented in FIG. 1, it will be understood that a typical computer system may have multiple buses, often arranged in a complex topology, such as point-to-point links in hierarchical, star or web configurations, multiple hierarchical buses, parallel and redundant paths, etc., and that separate buses may exist for communicating certain information, such as addresses or status information. In one embodiment, in addition to various high-speed data buses used for communication of data as part of normal data processing operations, a special service bus using an I2C protocol connects the various hardware units, allowing the service processor or other low-level processes to perform various functions independently of the high-speed data buses, such as powering on and off, reading hardware unit identifying data, and so forth.

The major physical units are typically constructed from one or more field replaceable units. Often, such a field replaceable unit (FRU) is an electronic circuit card assembly. However, a physical unit need not be an electronic circuit card assembly. It could alternatively be a component such as a disk drive storage device 122, a terminal 121, a power supply, and so forth. Additionally, a single physical unit may have one or more FRUs within itself. For larger systems, a single major functional component, such as CPU 101 or memory 102, will often comprise multiple physical units in the form of electronic circuit card assemblies, although it is alternatively possible for more than one major functional component to reside in a single physical unit. In FIG. 1, CPU 101 is represented as containing four circuit cards 111A-D, each of which may contain one or more processors; memory 102 is represented as containing six cards 112A-112F, service processor 103 as containing a single card 113, buses 105 as containing three cards 115A-C, terminal interface 106 as containing three cards 116A-116C, storage interface 107 as containing two cards 117A-B, I/O and other interface 108 as containing two cards 118A-B, and communications interface 109 as containing two cards 119A-B.

It should be understood that FIG. 1 is intended to depict representative components of an exemplary data processing system 100 at a high level, that individual components may have greater complexity than represented FIG. 1, and that the number, type and configuration of such functional units and physical units may vary considerably. It will further be understood that not all components shown in FIG. 1 may be present in a particular computer system, and that other components in addition to those shown may be present. Although system 100 is depicted as a multiple user system having multiple terminals, system 100 could alternatively be a single-user system, typically containing only a single user display and keyboard input.

Figure 2:
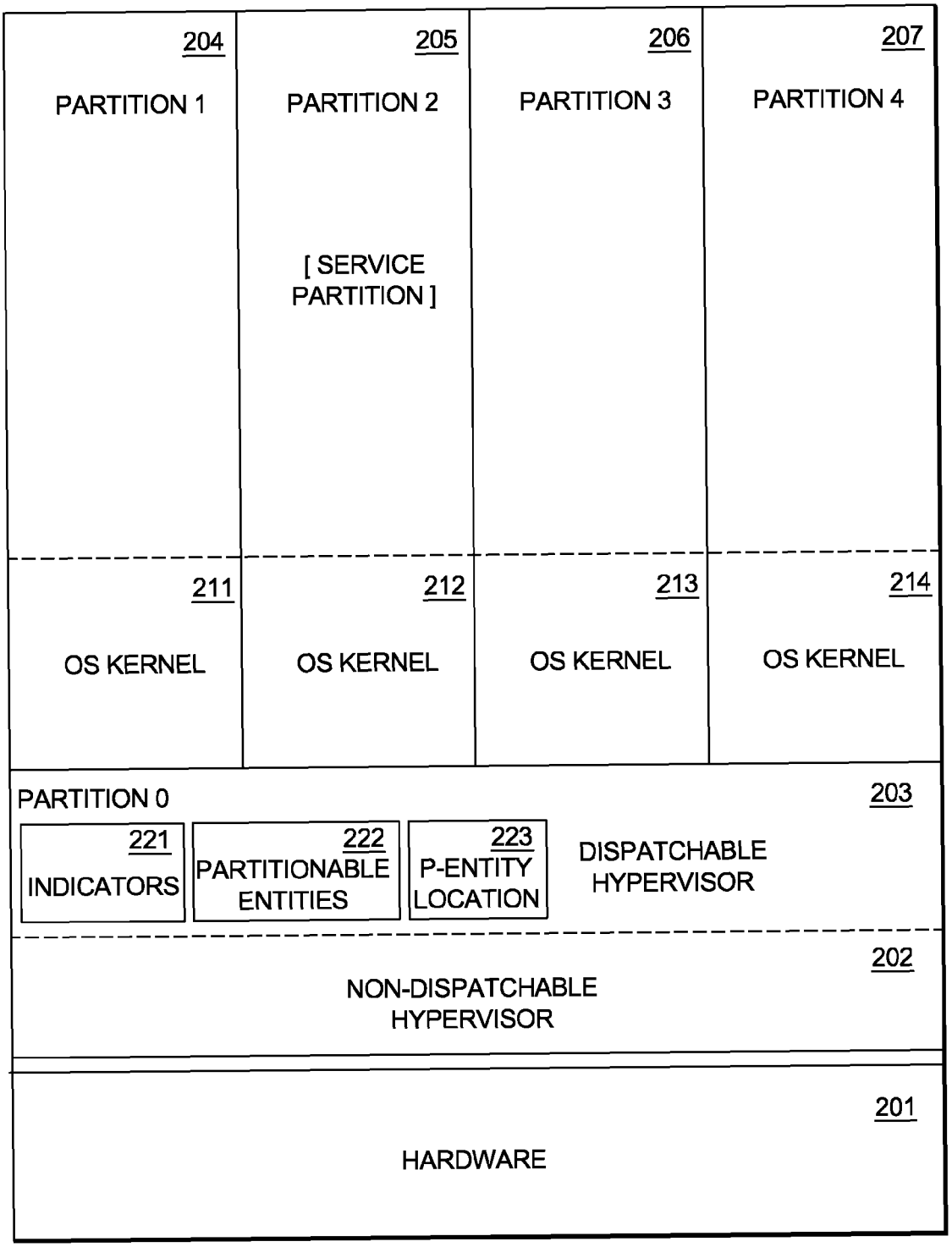
FIG. 2 is a conceptual illustration of logical partitions at different hardware and software levels of abstraction in a data processing system, in accordance with an aspect of the present invention.

FIG. 2 is a conceptual illustration showing the existence of logical partitions at different hardware and software levels of abstraction in computer system 100. FIG. 2 represents a system having four logical partitions 204-207 available for user applications, designated "Partition 1", "Partition 2", etc., it being understood that the number of partitions may vary. As is well known, a computer system is a sequential state machine which performs processes. These processes can be represented at varying levels of abstraction. At a high level of abstraction, a user specifies a process and input, and receives an output. As one progresses to lower levels, one finds that these processes are sequences of instructions in some programming language, which continuing lower are translated into lower level instruction sequences, and pass through licensed internal code and ultimately to data bits which get put in machine registers to force certain actions. At a very low level, changing electrical potentials cause various transistors to turn on and off. In FIG. 2, the "higher" levels of abstraction are represented toward the top of the figure, while lower levels are represented toward the bottom.

As shown in FIG. 2 and explained earlier, logical partitioning is a code-enforced concept. At the hardware level 201, logical partitioning does not exist. As used herein, hardware level 201 represents the collection of physical devices (as opposed to data stored in devices), such as processors, memory, buses, I/O devices, etc., shown in FIG. 1 possibly including other hardware not shown in FIG. 1. As far as a processor of CPU 101 is concerned, it is merely executing machine level instructions. In one embodiment, each processor is identical and may be interchangeable. While code can direct tasks in certain partitions to execute on certain processors, there is nothing in the processor itself which dictates this assignment, and in fact the assignment can be changed by the code. Therefore the hardware level is represented in FIG. 2 as a single entity 201, which does not itself distinguish among logical partitions.

Partitioning is enforced by a partition manager (known as the "hypervisor"), consisting of a non-relocatable, non-dispatchable portion 202 (also known as the "non-dispatchable hypervisor" or "partitioning licensed internal code" or "PLIC"), and a relocatable, dispatchable portion 203. The hypervisor is super-privileged executable code which is capable of accessing resources, such as processor resources and memory, assigned to any partition. The hypervisor maintains state data in various special purpose hardware registers, and in tables or other structures in general memory, which govern boundaries and behavior of the logical partitions. Among other things, this state data defines the allocation of resources to logical partitions, and the allocation is altered by changing the state data rather than by physical reconfiguration of hardware.

In one embodiment, the non-dispatchable hypervisor 202 comprises non-relocatable instructions which are executed by CPU 101 just as instructions for tasks executing in the partitions. The code is non-relocatable, meaning that the code which constitutes the non-dispatchable hypervisor is at a fixed real address in memory. Non-dispatchable hypervisor 202 has access to the entire real memory range of system 100, and can manipulate real memory addresses. The dispatchable hypervisor code 203 (as well as all partitions) is contained at addresses which are relative to a logical partitioning assignment, and therefore this code is relocatable. The dispatchable hypervisor behaves in much the same manner as a user partition (and for this reason is sometimes designated "Partition 0"), but it is hidden from the user and not available to execute user applications. In general, non-dispatchable hypervisor 202 handles assignment of tasks to physical processors, memory mapping and partition enforcement, and similar essential partitioning tasks required to execute application code in a partitioned system, while dispatchable hypervisor 203 handles maintenance-oriented tasks, such as creating and altering partition definitions.

As represented in FIG. 2, there is no direct path between higher levels (levels above non-dispatchable hypervisor 202) and hardware level 201. While machine instructions of tasks executing at higher levels can execute directly on the processor, access to hardware resources is controlled by the non-dispatchable hypervisor. Non-dispatchable hypervisor 202 enforces logical partitioning of processor resources. That is, task dispatchers at a higher level (the respective operating systems) dispatch tasks to virtual processors defined by the logical partitioning parameters, and the hypervisor in turn dispatches virtual processors to physical processors at the hardware level 201 for execution of the underlying task. The hypervisor also enforces partitioning of other resources, such as allocations of memory to partitions, and routing I/O to I/O devices associated with the proper partition.

Dispatchable hypervisor 203 performs many auxiliary system management functions which are not the province of any partition. The dispatchable hypervisor generally manages higher level partition management operations such as creating and deleting partitions, concurrent hardware maintenance, allocating processors, memory and other hardware resources to various partitions, etc. In particular, the dispatchable hypervisor may handle access to physical indicator lights. Dispatchable hypervisor 203 may include a state data structure of visual indicators 221, a state data structure of partitionable entity allocations to partitions 222, and a state data structure of partitionable entity locations 223, which, in conjunction with dispatchable hypervisor code, are used to regulate access to and activate and deactivate physical indicator lights.

A special user interactive interface is provided into dispatchable hypervisor 203, for use by a system administrator, service personnel, or similar privileged users. In one embodiment, i.e., where system 100 contains a service processor 103 and attached hardware management console 114, the HMC 114 provides an interface to the dispatchable hypervisor for service and partition management, and will so be assumed in the description herein.

Above non-dispatchable hypervisor 202 are a plurality of logical partitions 204-207. Each logical partition behaves, from the perspective of processes executing within it, as an independent computer system, having its own memory space and other resources. Each logical partition therefore contains a respective operating system kernel herein identified as the "OS kernel" 211-214. At the level of the OS kernel and above, each partition behaves differently, and therefore FIG. 2 represents the OS Kernel as four different entities 211-214 corresponding to the four different partitions. In general, each OS kernel 211-214 performs roughly equivalent functions. However, it is not necessarily true that all OS kernels 211-214 are identical copies of one another, and they could be different versions of architecturally equivalent operating systems, or could even be architecturally different operating system modules. OS kernels 211-214 perform a variety of task management functions, such as task dispatching, paging, enforcing data integrity and security among multiple tasks, and so forth.

Above the OS kernels in each respective partition there may be a set of high-level operating system functions, and user application code and data (not shown). A user may create code above the level of the OS Kernel, which invokes high level operating system functions to access the OS kernel, or may directly access the OS kernel. In the IBM i™ Operating System, a user-accessible architecturally fixed "machine interface" forms the upper boundary of the OS kernel, (the OS kernel being referred to as "SLIC"), but it should be understood that different operating system architectures may define this interface differently, and that it would be possible to operate different operating systems on a common hardware platform using logical partitioning.

One of the logical partitions is optionally designated a service partition. In FIG. 2, partition 205 is designated the service partition, which is a partition assigned for use by system maintenance personnel to perform various administrative and maintenance functions. The service partition may be used exclusively for administrative and maintenance functions, or it may also be used for user applications. However, where system 100 contains a hardware management console 114 as shown in the illustrated embodiment of FIG. 1, most of the service and maintenance functions are performed from the hardware management console rather than the service partition.

As noted initially, a basic problem addressed by the present invention is the need for a general purpose communications facility between the hardware management consoles (HMCs) and the logical partitions of a logically partitioned data processing system, such as the Power® computing systems offered by International Business Machines Corporation, Armonk, N.Y., U.S.A. As a specific, commercially available example, a data processing system implementing a hypervisor-based communications facility such as described hereinbelow can be built upon technologies found in IBM's p/i Series product line firmware and systemware, as described in the "Power Architecture Platform Reference" (PAPR) material at Power.org (http://www.power.org/members/developers/specs/PAPR_Version_2.7_09Oct07.pdf), which is hereby incorporated herein by reference. (IBM®, pSeries®, iSeries® and Power® are registered trademarks of International Business Machines Corporation, Armonk, N.Y., U.S.A.) The communications facility presented herein can be employed for systems management tasks, such as concurrent hardware maintenance, dynamic logical partitioning, inventory collection, virtual I/O device mappings, etc. This hypervisor-based communications facility is a general purpose, low-latency, fully asynchronous communications approach between the HMCs and the logical partitions. This is contrasted with existing communications facilities which either are not general purpose, or which require additional physical connections between the HMCs and logical partitions, such as real LAN connections and additional configuration tasks.

Generally stated, presented herein is a general purpose, zero maintenance, low-latency, fully asynchronous, robust communications facility between HMCs and logical partitions that is implemented in the hypervisor. This hypervisor-implemented communications facility is referred to herein as a hypervisor pipe. The hypervisor pipe is general purpose in that it is not specific to any particular type or class of commands or flows between HMCs and the hypervisor (or between the hypervisor and the logical partitions), such as dynamic logical partitioning versus virtual I/O, asynchronous versus synchronous, etc.

The hypervisor pipe is zero maintenance in the sense that the pipe itself is not aware of the specific commands (i.e., requests and responses) that are flowing between the HMCs and logical partitions. The specific commands are treated as cargo residing in basic or generic transport primitives that flow through the hypervisor pipe. The hypervisor recognizes a generic transport primitive, but does not inspect or parse the cargo contained within the generic transport primitive. Therefore, the hypervisor is not impacted when new command flows between the HMCs and the logical partitions are introduced.

The hypervisor pipe is designed to contribute minimal latency to communication flows through the pipe. The latency attributed to the hypervisor is mainly the time required to direct memory access (DMA) the flows to/from the flexible service processor (FSP), which is the means by which the HMC and hypervisor communicate, and to/from the logical partitions. Processing done by the hypervisor pipe is primarily routing between one or more HMCs and one or more logical partitions, pacing, and statistics collection.

To maximize hypervisor pipe throughput, while minimizing its system resource requirements (i.e., memory, buffers, tasks) and prevent one logical partition or HMC that is behaving poorly (i.e., not responding in a timely fashion) from negatively impacting throughput for other partitions and HMCs, the hypervisor pipe is fully asynchronous in nature and uses separate buffer pools for each logical partition and each HMC. In other words, if HMC H1 initiates a communications flow to partition P1, but P1 is very busy or hung and not responding, the hypervisor either routes the communications flow all the way to P1 if the P1 buffer pool is not exhausted, and then acknowledges H1, after which H1 may timeout waiting for the response flow from P1 if P1 is truly not responding, or if the P1 buffer pool at the hypervisor is exhausted, the hypervisor acknowledges HMC H1 with a busy status. The pipe task and the hypervisor do not block waiting for a response or acknowledgement from an HMC or partition, and pass responsibility for handling unresponsive targets back to the source of the flow via a busy status or timeouts on the flows themselves.

The hypervisor pipe presented herein is robust in that there is no input/output (I/O) adapter and communication cable, which reduces opportunities for configuration problems and hardware failures.

Thus, the hypervisor-based communications facility (i.e., the hypervisor pipe) interfaces between HMCs (external platform management devices) and logical partitions of a logically partitioned data processing system. The hypervisor pipe is a general purpose communications facility such that it can handle any number of types or classes of flows/commands between HMCs and logical partitions. The hypervisor pipe is aware only of the basic transport primitive, and not the specific commands (requests or responses) flowing between the HMCs and the partitions, which are treated as simple cargo or additional data, and therefore is not impacted each time a new command, request or response flow between HMCs and logical partitions is introduced into the data processing system. The hypervisor pipe is able to route flows between one or more HMCs and one or more logical partitions, and does not allow one unresponsive partition or HMC to prevent the transport of flows or negatively impact the performance of those flows to/from other partitions or HMCs.

The communications facility presented herein is advantageous over the conventional RMC resource management mechanism described above because it does not require a separate, physical LAN connection between each HMC and logical partition, thereby reducing hardware requirements (no LAN adapters), configuration effort (no network administration, cabling), and failure rates (no adapter or cable failures). There is still a network connection between each HMC and the system managed by that HMC, however. For managed systems with multiple logical partitions, the communications facility presented herein represents a potentially significant reduction in network overhead compared with the RMC resource management mechanism.

Figure 3:
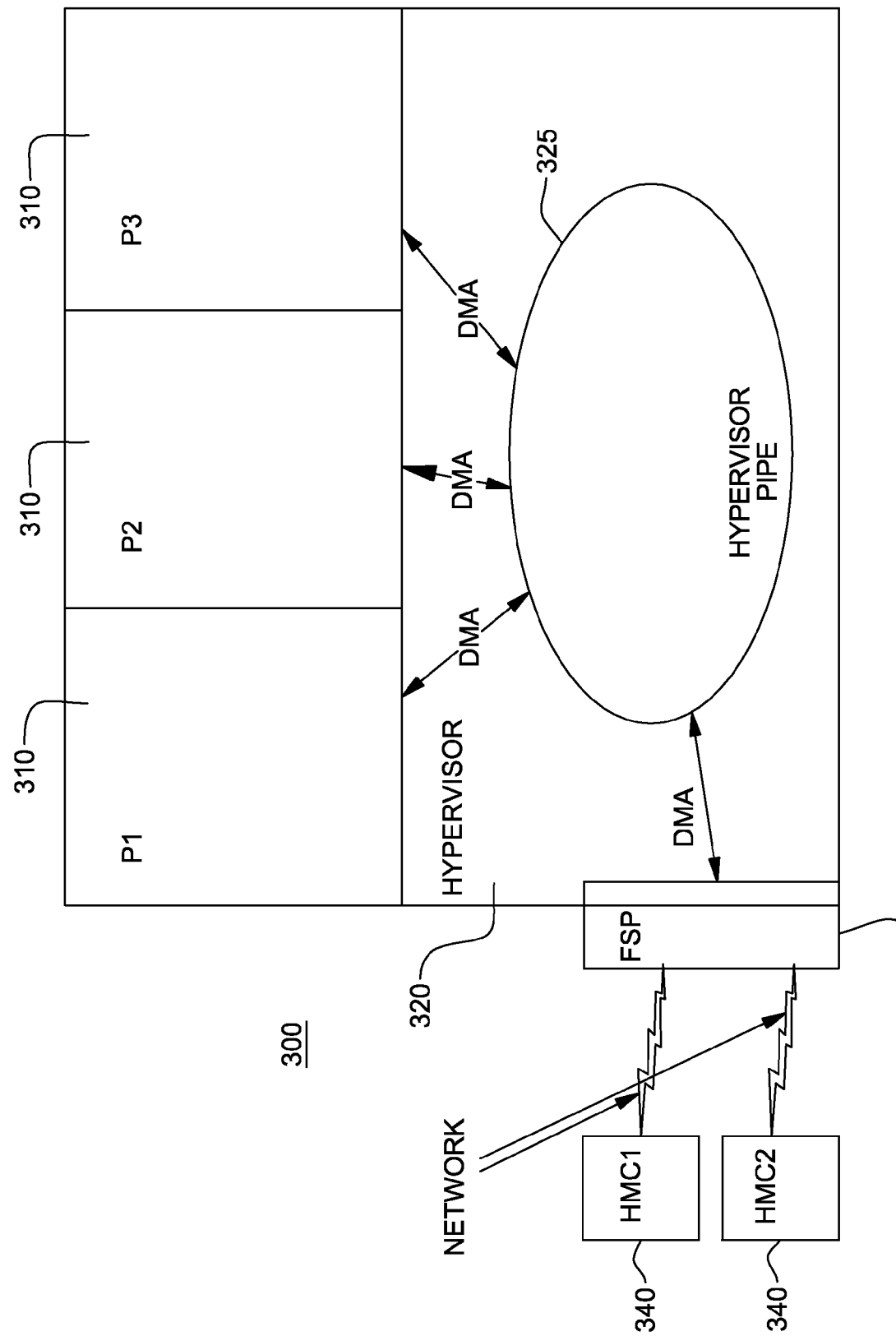
FIG. 3 is a block diagram illustration of one physical embodiment of a logically partitioned data processing system with a hypervisor-based communications facility, in accordance with an aspect of the present invention.
Figure 4:
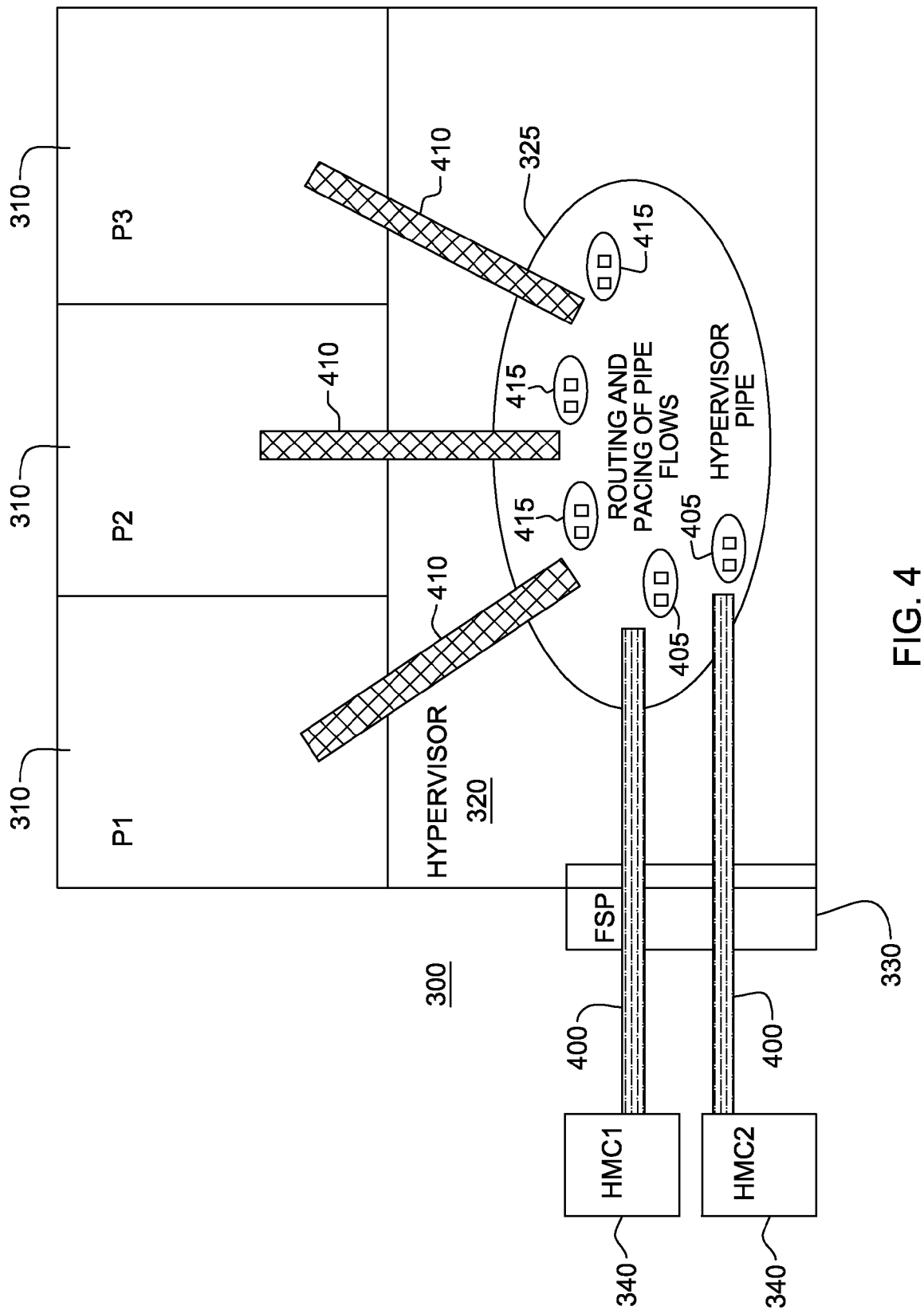
FIG. 4 is a lower-level logical view of the data processing system and communications facility of FIG. 3, with communication sessions established between the HMCs and a hypervisor pipe, and between the logical partitions and the hypervisor pipe, in accordance with an aspect of the present invention.
Figure 5:
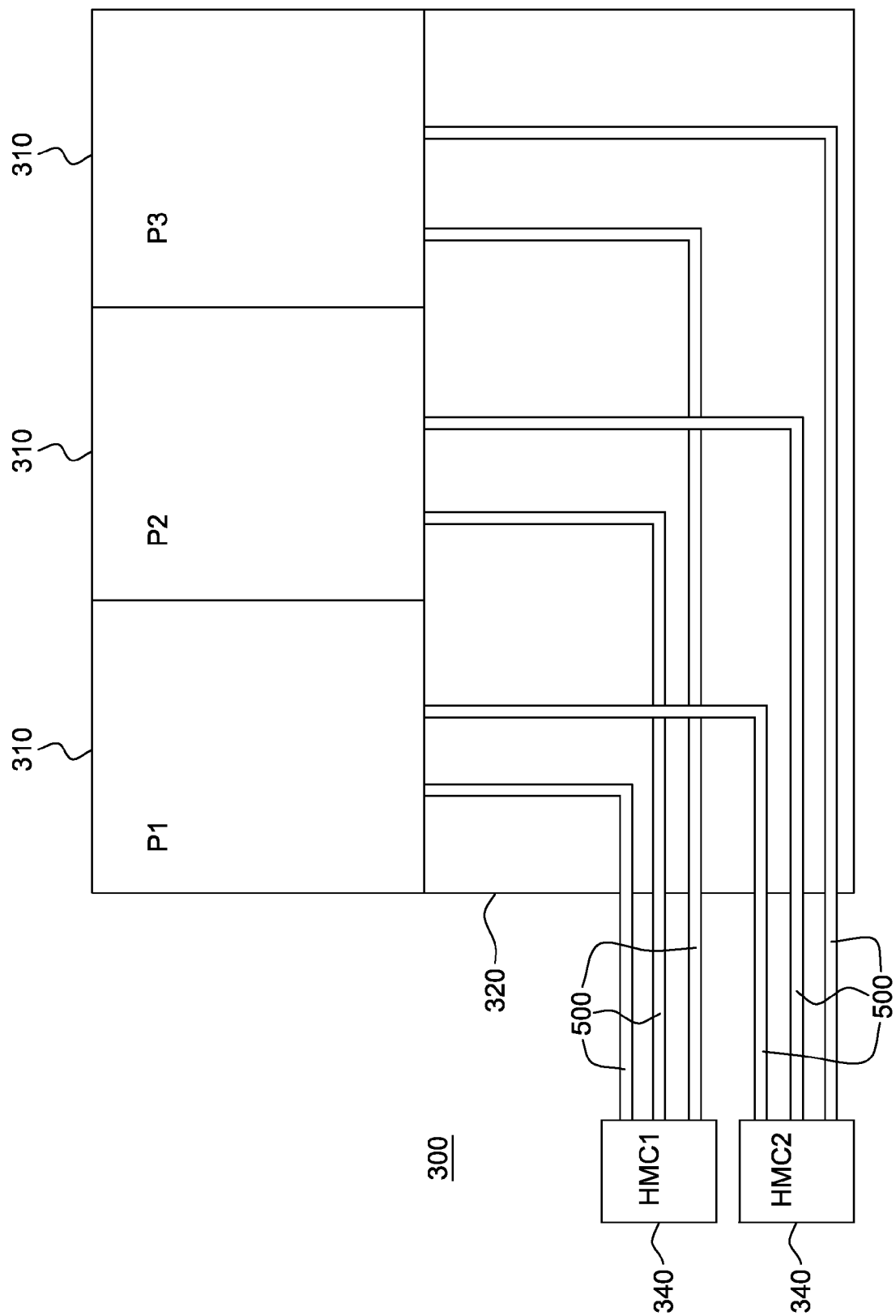
FIG. 5 is a higher-level logical depiction of the hypervisor-based communications facility of FIGS. 3 & 4, in accordance with an aspect of the present invention.

FIGS. 3-5 depict three different views of a hypervisor pipe, in accordance with an aspect of the present invention.

In FIG. 3, a physical view of the framework is presented, wherein the logically partitioned data processing system 300 includes multiple logical partitions 310 (labeled P1, P2 & P3), a hypervisor 320 comprising the hypervisor pipe (or communications facility) 325 described herein, a flexible service processor 330, and multiple hardware management consoles (HMCs) 340, which are networked through flexible service processor (FSP) 330 to hypervisor 320. Communications between FSP 330 and hypervisor 320 are via direct memory access (DMA) and the hypervisor and logical partitions also communicate via a form of inter-partition DMA. The hypervisor pipe component in the hypervisor does flow routing, pacing and statistics collection.

FIG. 4 depicts a lower-level logic view of data processing system 300, wherein the HMCs 340 and hypervisor 320, or more particularly, hypervisor pipe 325, establish logical HMC command sessions 400 through FSP 330. As shown, there is a single communications session 400 between each HMC and the hypervisor. Associated with each HMC to hypervisor session 400 is a pool of message buffers 405 within hypervisor pipe 325. As explained further below, these message buffers are employed in implementing the hypervisor-based communications facility between the HMCs and logical partitions. Similarly, the logical partitions and the hypervisor establish logical partition event sessions 410, over which communication flows are exchanged via the generic transport primitive. Respective pools of message buffers 415 are again defined for each logical partition to hypervisor session 410. In operation, the hypervisor parses the generic primitive transport commands to determine the target and move the cargo between a respective HMC and logical partition.

In one implementation, in addition to the generic transport primitive, three types of session management request are employed, that is, an open communications session request, a close communications session request and an exchange capabilities request may be employed between the HMC and hypervisor pipe, as well as between each logical partition in the hypervisor pipe. Thus, in one embodiment, a request from an HMC or a logical partition may comprise an open request, an ExchangeCaps request, a close request or a generic transport primitive (referred to in the logic flows described below as a HypePipe request).

FIG. 5 depicts a higher-level logical representation of data processing system 300, wherein the logical pipe presented herein can be thought of as establishing a point-to-point, logical HMC to partition communications session 500 between each HMC 340 and each partition 310 through hypervisor 320 of the data processing system. This figure is a conceptual view of the communications framework at its highest level. Endpoints in the HMCs send communication flows to endpoints in the logical partitions, and vice versa.

Figure 9:
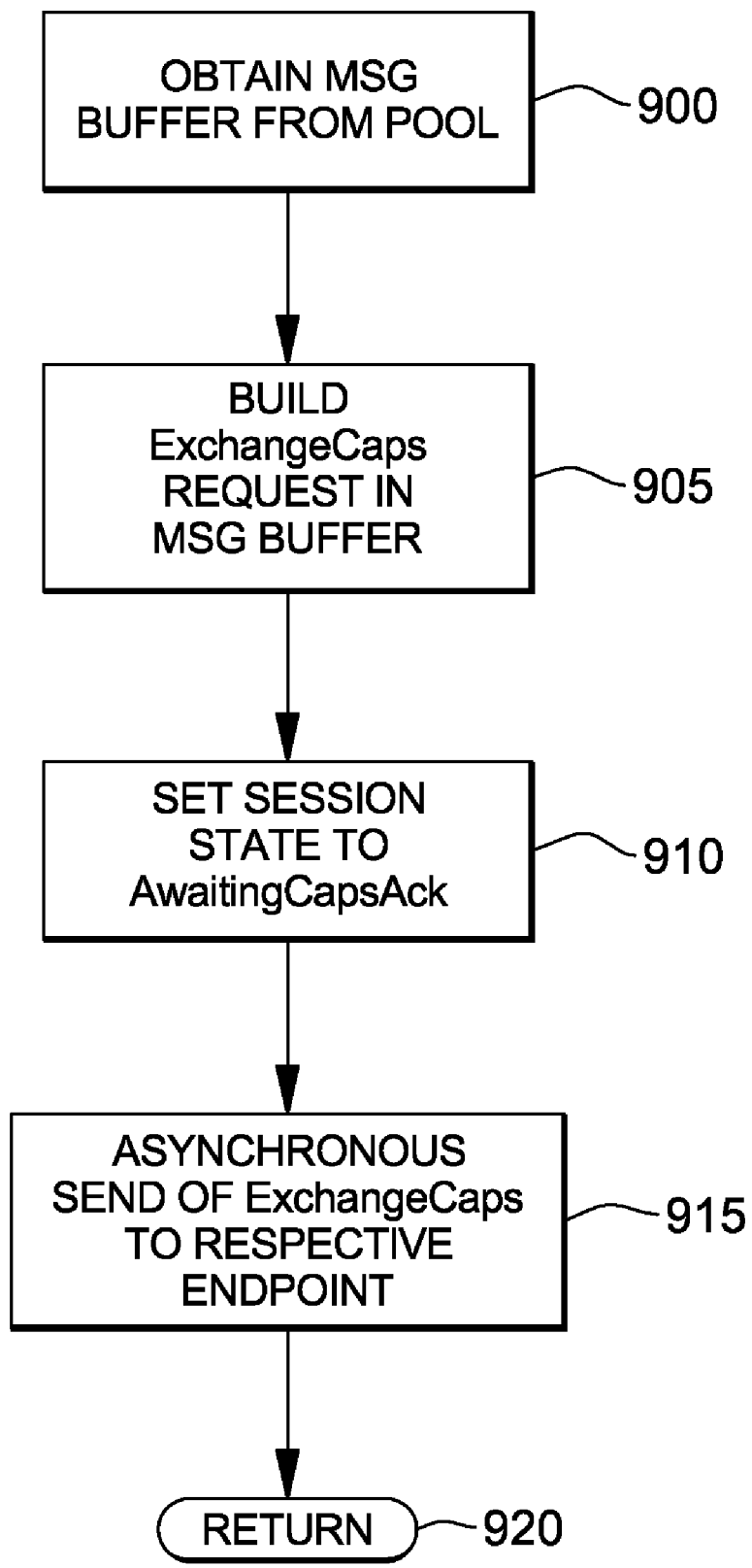
FIG. 9 is a flowchart of one embodiment of hypervisor logic for building and sending an exchange capabilities request to a target endpoint of the logically partitioned data processing system, in accordance with an aspect of the present invention.
Figure 10:
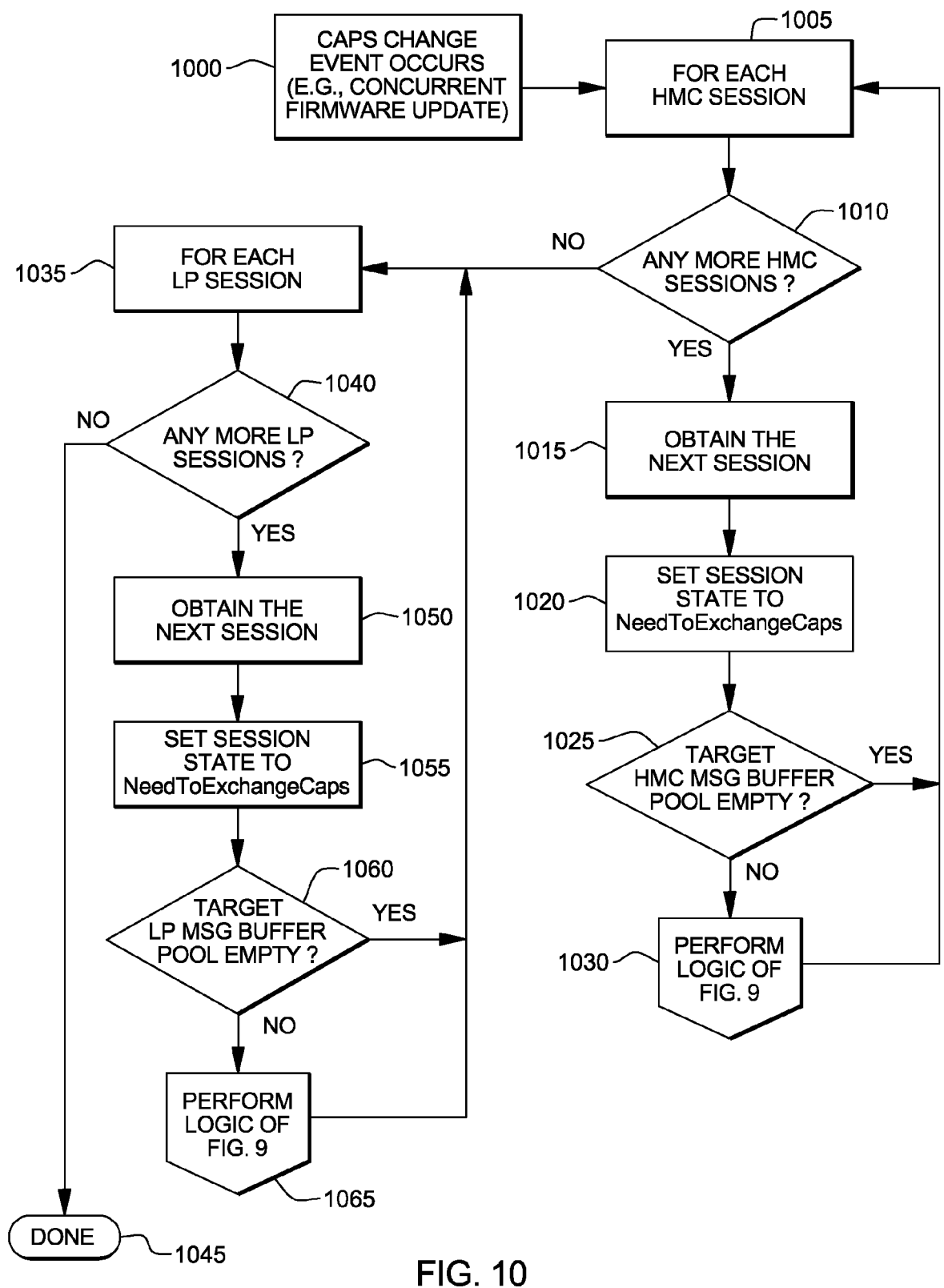
FIG. 10 is a flowchart of one embodiment of hypervisor logic executed when an event occurs that may have caused hypervisor capabilities to change within the logically partitioned data processing system, in accordance with an aspect of the present invention.
Figure 11:
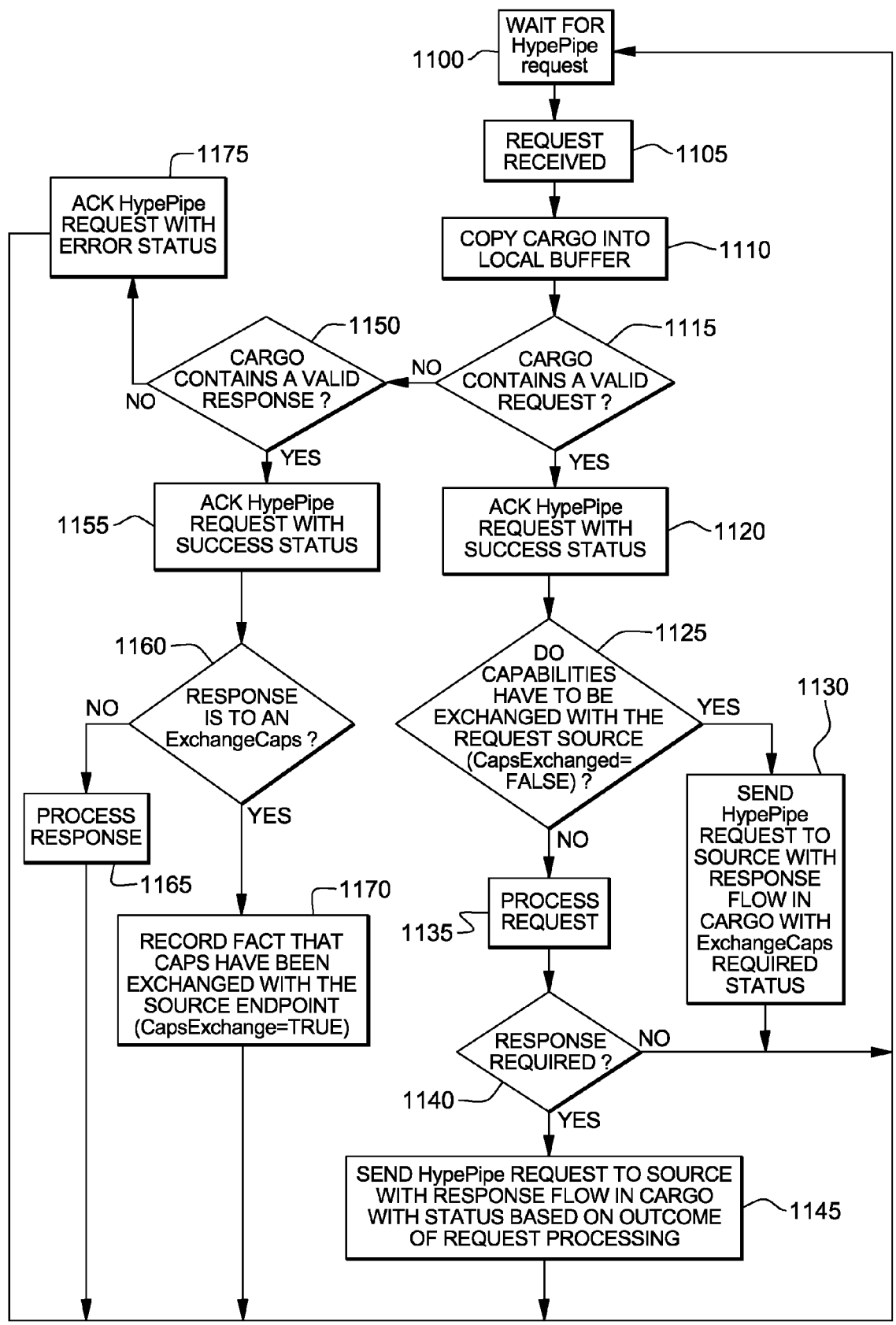
FIG. 11 is a flowchart of one embodiment of endpoint logic for processing a target transport primitive at a target endpoint of a logically partitioned data processing system, in accordance with an aspect of the present invention.
Figure 12:
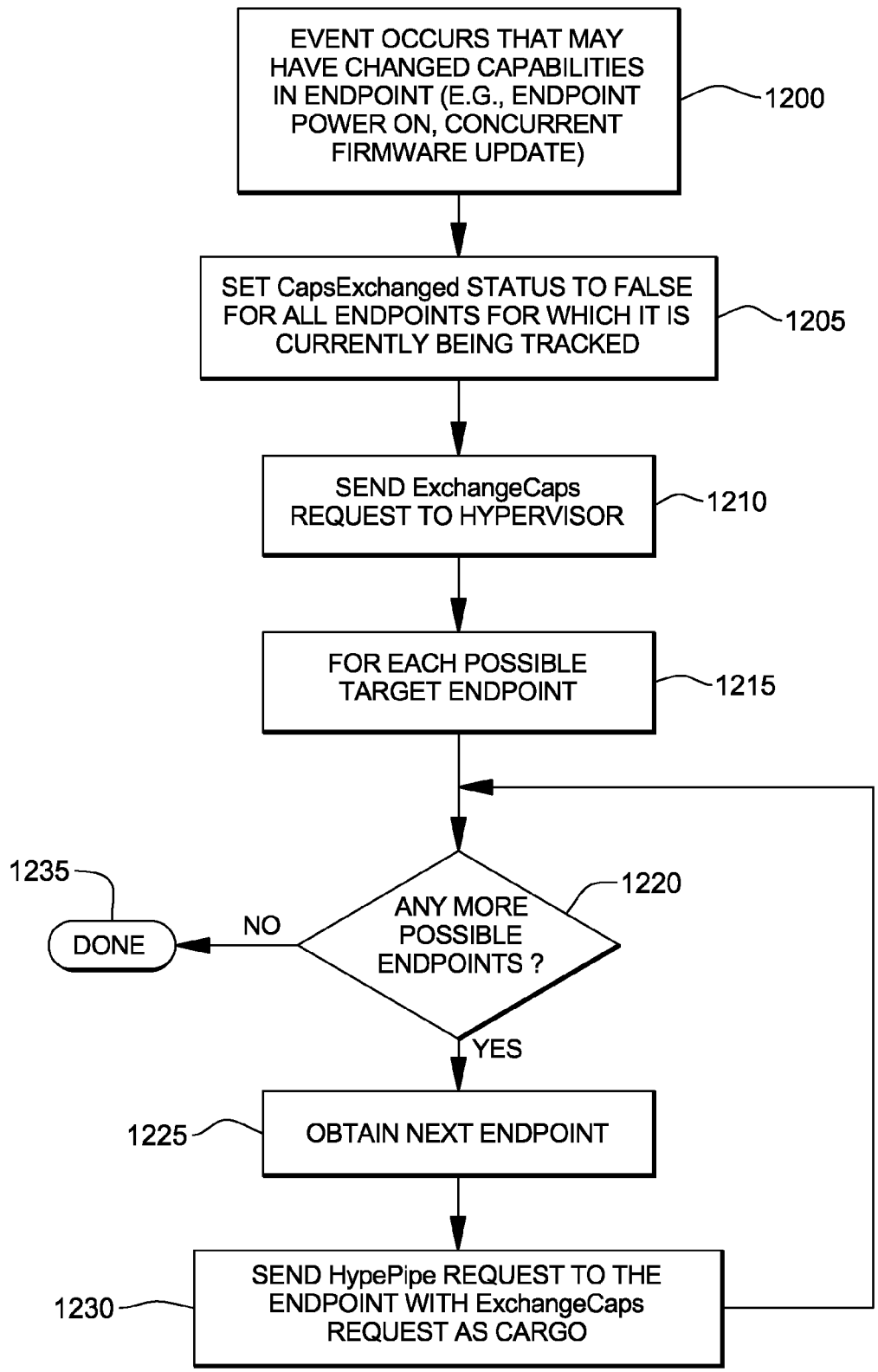
FIG. 12 is a flowchart of one embodiment of endpoint logic for actively initiating an exchange capabilities request from the endpoint, in accordance with an aspect of the present invention.
Figure 13:
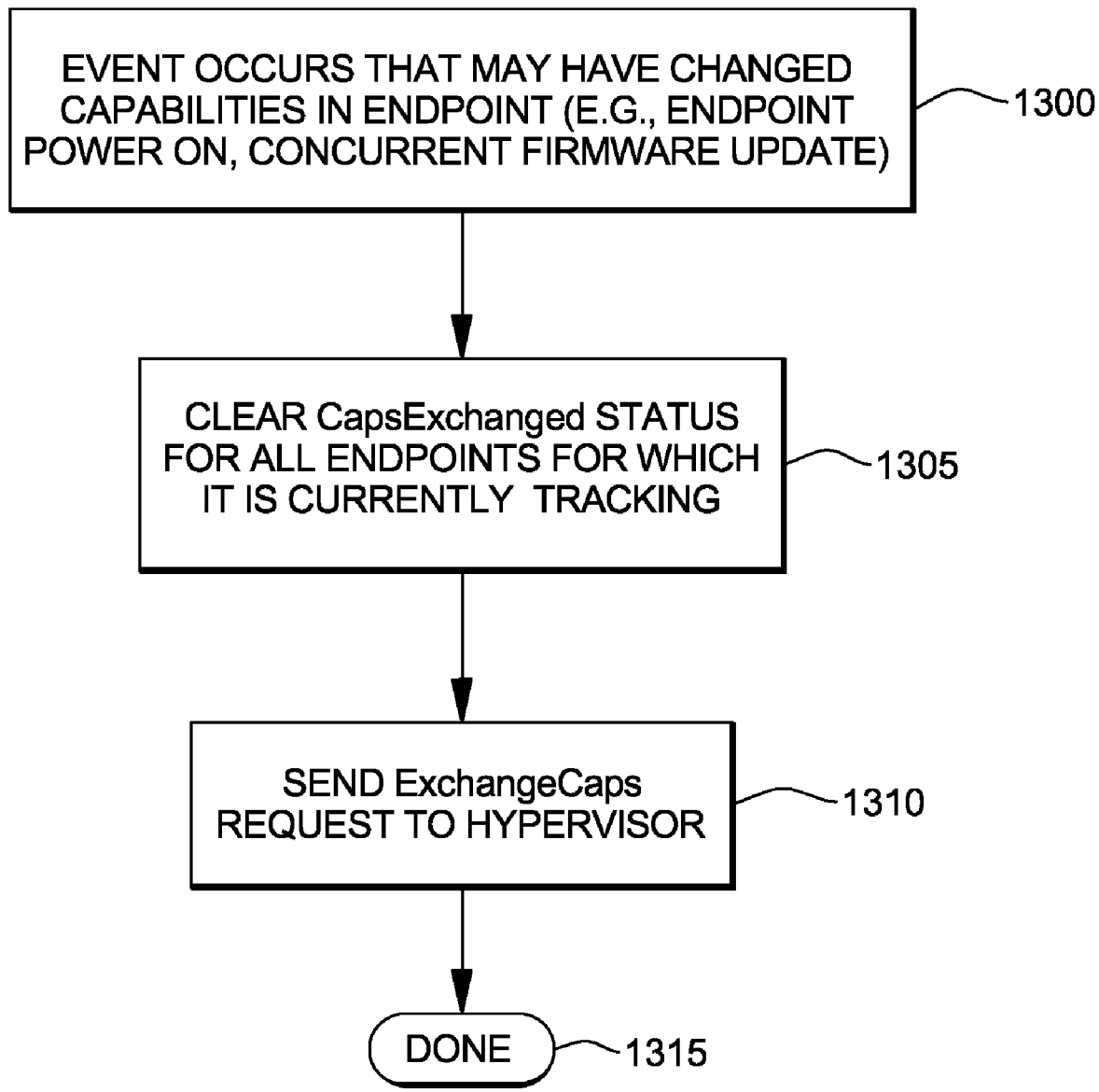
FIG. 13 is a flowchart of one embodiment of endpoint logic for passively performing an exchange of capabilities responsive to a capabilities change event at the endpoint of the communications facility, in accordance with an aspect of the present invention.

FIGS. 6-10 depict one embodiment of hypervisor (or hypervisor pipe) logic for implementing a hypervisor-based communications facility such as presented herein, while FIGS. 11-13 depict certain endpoint logic flows implementable within an HMC or logical partition, in accordance with an aspect of the present invention.

Figure 6:
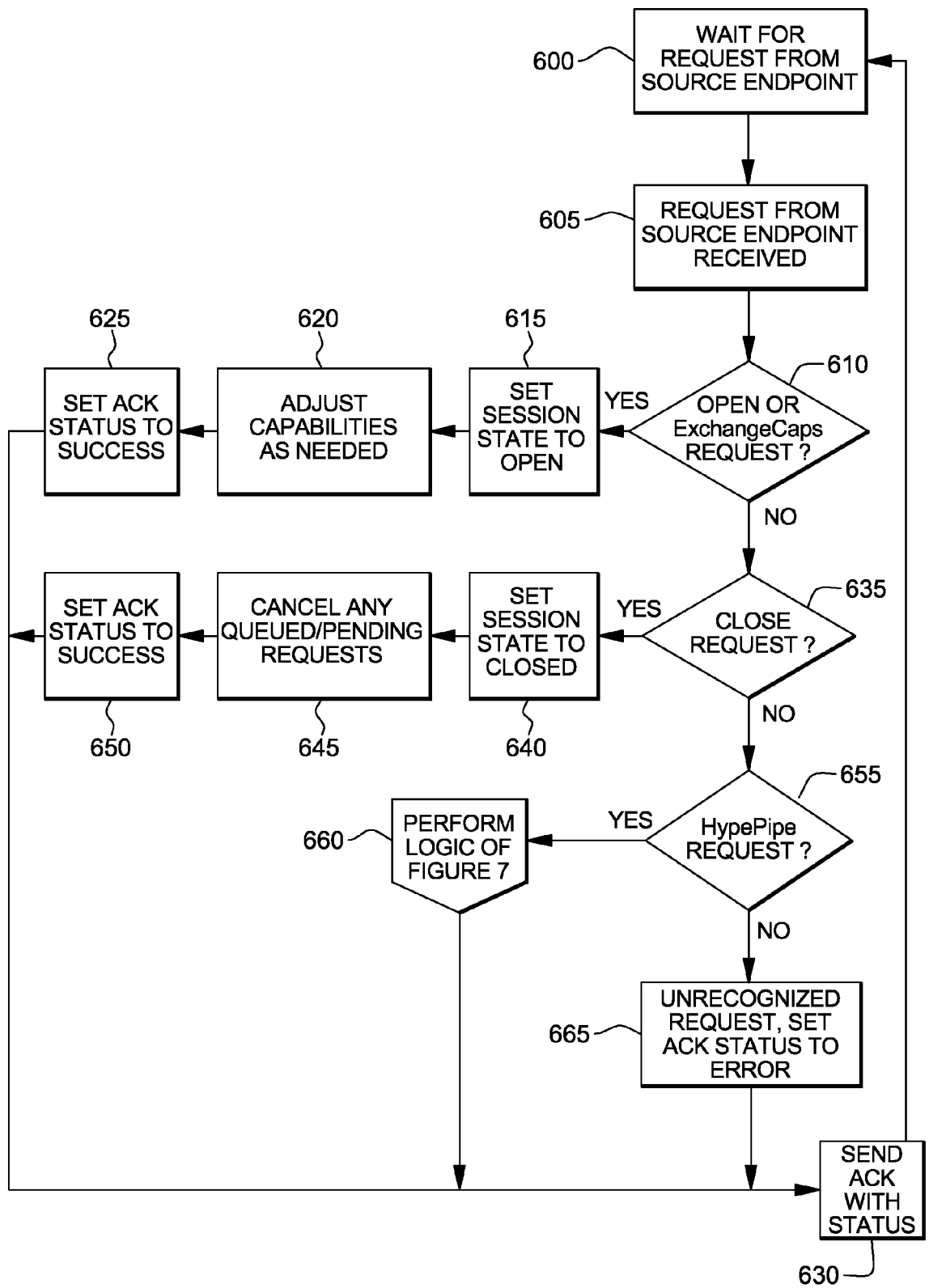
FIG. 6 is a flowchart of one embodiment of hypervisor logic for processing a communication received from a source endpoint of the logically partitioned data processing system, in accordance with an aspect of the present invention.

Referring first to FIG. 6, the hypervisor pipe waits for a request from a source endpoint 600. As used herein, the source endpoint is either an HMC or a logical partition, and the request may comprise a session management request (such as an open session request, an exchange capabilities request, or a closed session request), or a hypervisor pipe (or HypePipe) request. The hypervisor pipe request is the generic or basic transport primitive described herein. It is this primitive which the endpoints use to communicate via the hypervisor pipe. In one embodiment, the generic transport primitive has the following data structure:
target endpoint ID|cargo length|cargo (encapsulated request or response communication)|

The hypervisor initially determines whether a received source endpoint request 605 is an open session management request or an exchange capabilities session management request 610. If either, the session state between the source endpoint and the hypervisor is set to open 615, and capabilities are set within the hypervisor that are required by the source endpoint 620. The acknowledgement status (ACK status) is set to success 625, and the acknowledgement, including its status and adjusted capabilities, is returned to the source endpoint 630. If the source endpoint request is other than an open session management or an exchange capabilities session management request, then the hypervisor determines whether the request is a closed session management request 635. If so, then the session state between the source endpoint and the hypervisor is set to closed 640, and any queued or pending requests for that session are canceled 645. The hypervisor sets the acknowledgement status to success 650 and sends the acknowledgement with the accompanying status back to the source endpoint 630, after which it returns to wait for a next source endpoint request 600. If the source endpoint request is other than a session management request, then the hypervisor determines whether it is a basic transport primitive, that is, a hypervisor pipe (or HypePipe) request. If "yes", then from inquiry 655 the hypervisor performs the processing of FIG. 7660 (described below), before returning to wait for a next source endpoint request. If the source endpoint request is not a session management request or a hypervisor pipe request, then the request is an unrecognized request, and so acknowledgement status is set to error 665 and the acknowledgement is returned with an error status 630.

Figure 7:
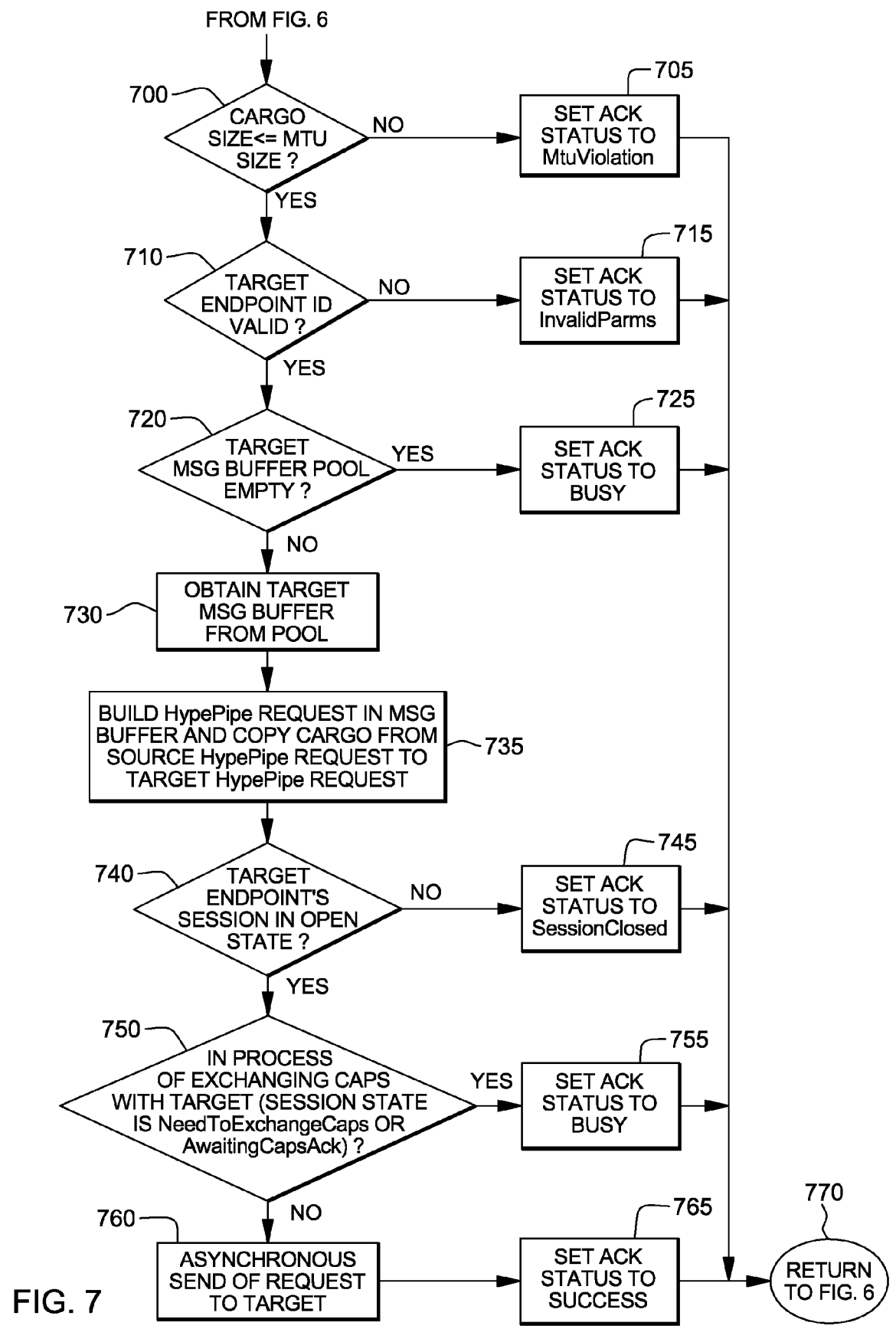
FIG. 7 is a flowchart of one embodiment of logic for processing a generic transport primitive (HypePipe) at the hypervisor, in accordance with an aspect of the present invention.

Assuming that the hypervisor pipe receives a hypervisor pipe request (i.e., a generic transport primitive) from the source endpoint, then the logic flow of FIG. 7 is performed. The hypervisor pipe determines whether the generic transport primitive has a cargo size which is acceptable, that is, has less than or equal to a maximum transfer unit (MTU) size 700. If "no", then the acknowledgement status is set to an MTU violation 705 and the hypervisor returns 770 to the logic of FIG. 6. Otherwise, the hypervisor determines whether the target endpoint identification is a valid endpoint identification within the data processing system 710. If "no", then the acknowledgement status is set to an invalid parameter 715, and the hypervisor returns 770 to the logic of FIG. 6. Assuming that the cargo size and target endpoint identification are acceptable, then the hypervisor determines whether the target message buffer pool is empty 720. If "yes", then the acknowledgement status is set to busy 725 and the hypervisor returns 770. Otherwise, a target message buffer is withdrawn from the target message buffer pool 730 and a new hypervisor pipe request (i.e., a target transport primitive) is built in the target message buffer, which includes copying of the cargo from the source hypervisor pipe request (i.e., the source transport primitive) to the target hypervisor pipe request 735. Once this target transport primitive is built, the hypervisor determines whether the target endpoint session is in open state 740. If "no", then the acknowledgment status is set to session closed 745 and the hypervisor returns 770 is to the logic of FIG. 6. Otherwise, the hypervisor determines whether it is in the process of exchanging capabilities with the target endpoint (that is, the session state is a need to exchange capabilities or awaiting capabilities acknowledgement) 750. If "yes", then the acknowledgment status is set to busy 755, and the hypervisor returns 770 to the logic of FIG. 6. Otherwise, the target transport primitive is asynchronously sent to the target endpoint 760, and the acknowledgment status is set to success 765, after which processing returns 770.

Figure 8:
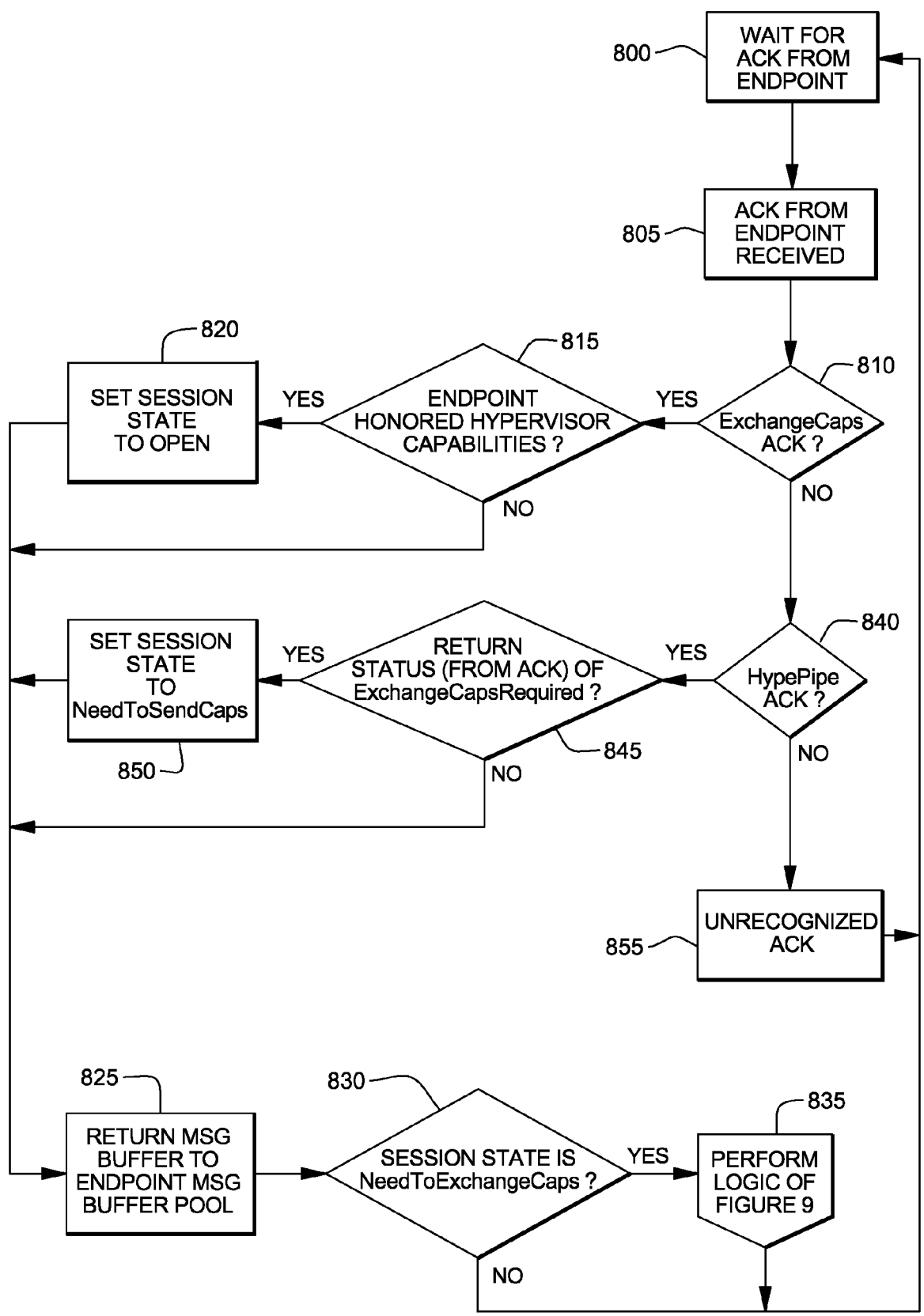
FIG. 8 is a flowchart of one embodiment of hypervisor logic for processing an acknowledgement (ACK) received from an endpoint of the logically partitioned data processing system, in accordance with an aspect of the present invention.

FIG. 8 depicts one embodiment of hypervisor logic for processing an acknowledgment from an endpoint. The hypervisor waits for an acknowledgment from an endpoint 800. Upon receipt of an acknowledgement 805, the hypervisor determines whether the acknowledgement is an exchange capabilities acknowledgement 810. If "yes", then the hypervisor determines whether the endpoint honored the hypervisor capabilities request 815. If "yes", then the endpoint to hypervisor session state is set open 820 and the message buffer employed in the exchange capabilities request is returned to the respective endpoint message buffer pool 825. If the endpoint did not honor the hypervisor capabilities, then the message buffer is simply returned to the respective endpoint message buffer pool, and the endpoint to hypervisor session state is not set to open. After returning the message buffer to the corresponding endpoint message buffer pool in the hypervisor pipe, the hypervisor determines whether the session state is a need to exchange capabilities session state 830. If "no", then processing returns to wait for a next acknowledgment from an endpoint 800. Otherwise, the logic of FIG. 9 is performed 835 (described below).

If the received acknowledgement is other than an exchange capabilities acknowledgement, then the hypervisor determines whether the acknowledgement is a hypervisor pipe acknowledgement 840. If "yes", then the accompanying return status of the acknowledgment is checked to see whether it is an exchange capabilities required status 845. If "yes", then the session state is set to need to send capabilities 850, after which the endpoint message buffer is returned to the corresponding endpoint message buffer pool. If the acknowledgement received is other than an exchange capabilities or a hypervisor pipe acknowledgement, then the hypervisor fails to recognize the acknowledgment 855 and returns to wait for a next acknowledgement.

Assuming that the session state of the received acknowledgement is need to exchange capabilities, then from inquiry 830 the logic of FIG. 9 is performed 835. This logic executes an exchange of capabilities between the hypervisor pipe and the corresponding endpoint with which the communication session is established. Responsive to a communications session state set to need to exchange capabilities, the hypervisor obtains an endpoint message buffer from the corresponding pool of message buffers 900 and builds an exchange capabilities request in that message buffer 905. The hypervisor's communications session state is then set to awaiting capabilities acknowledgement 910 and the hypervisor asynchronously sends the exchange capabilities request to the respective endpoint of the communications session 915, before returning to the logic flow where called 920.

FIG. 10 depicts one embodiment of logic for processing a capabilities changing event within the data processing system. Upon occurrence of a capability changing event 1000, each HMC session is considered 1005. By way of example, a capabilities change event could be a concurrent firmware update. The hypervisor determines whether there are any more HMC sessions to be considered 1010, and if "yes", obtains a next HMC session 1015. The session state for this HMC session is set to need to exchange capabilities 1020 and the hypervisor determines whether the target HMC message buffer pool is empty 1025. If "yes", then a next HMC session is considered 1005. Otherwise, the logic of FIG. 9 is performed 1030, after which the hypervisor returns to evaluate a next HMC session. Once all HMC sessions have been processed, then from inquiry 1010, the hypervisor evaluates each logical partition (LP) session 1035. The hypervisor determines whether there is another open LP communications session 1040, and if "no", then the capabilities exchange logic has completed 1045. If there is another LP session to be considered, then the next LP communications session is obtained 1050 and its session state is set to need to exchange capabilities 1055. The hypervisor determines whether the target logical partition's message buffer pool is empty 1060, and if "yes", processes a next LP session. If the message buffer pool is not empty, then the logic of FIG. 9 is performed 1065 for the obtained LP session.

FIG. 11 depicts one embodiment of endpoint logic for processing a hypervisor pipe request (generic transport primitive) within a logical partition or an HMC. The endpoint waits for a hypervisor pipe request 1100 and upon receipt 1105 copies the cargo into a local buffer 1110. The endpoint then determines whether the cargo contains a valid endpoint request 1115. If "yes", the endpoint acknowledges the hypervisor pipe request with status success 1120. The endpoint then determines whether capabilities need to be exchanged with the request source 1125. If "yes", then a new hypervisor pipe request is sent to the source endpoint with a response as cargo, wherein the response contains a status which indicates that an exchange capabilities is required 1130. If capabilities do not need to be exchanged with the source endpoint, then the target endpoint processes the request 1135 and determines whether a response to the request is needed 1140. If "no", then the endpoint returns to wait for a next hypervisor pipe request. Otherwise, a response is generated and packaged as cargo of a new hypervisor pipe request that is sent from the target endpoint back to the source endpoint, with a status set based on the outcome of processing the first hypervisor pipe request at the target endpoint 1145.

If the cargo does not contain a valid request, then the endpoint determines whether the cargo contains a valid response 1150. If "yes", then an acknowledgement of the hypervisor pipe request is sent with status set as success 1155 and the endpoint determines whether the response is to an exchange capabilities request 1160. If "no", then the response is processed 1165, and if "yes", the target endpoint records the fact that the capabilities have been exchanged with the source endpoint 1170. If the cargo does not contain a valid request or a valid response, then an acknowledgement of the hypervisor pipe request is sent with an error status 1175.

FIGS. 12 & 13 depict two methods for exchanging capabilities responsive to a capabilities change event at an endpoint. FIG. 12 is an active method, while FIG. 13 is a passive method.

Referring first to FIG. 12, the endpoint logic determines that an event has occurred that may have changed capabilities in the endpoint 1200. For example, an endpoint powering on, or a concurrent firmware update has occurred. The endpoint logic sets the capabilities exchanged status to indicate that capabilities have not been exchanged for all endpoints for which capabilities exchanged status is being tracked 1205. An exchange capabilities request is then sent to the hypervisor 1210. In one embodiment, for endpoint powering on, capabilities may be exchanged via the open session request, rather than an exchange capabilities request. Considering all possible target endpoints 1215, the subject endpoint determines whether there is another endpoint to be considered 1220. If "yes", then the next endpoint is obtained 1225, and a hypervisor pipe request is sent to that endpoint with an exchange capabilities request as cargo 1230. Once all endpoints have been considered, processing is done 1235.

In an alternate approach, the logic of FIG. 13 may be employed to exchange capabilities responsive to a capabilities changing event in an endpoint. In this approach, an event occurs that may have changed capabilities in a subject endpoint, such as a concurrent firmware update 1300. The capabilities exchanged records at the subject endpoint are changed to indicated that capabilities have not been exchanged for all endpoints for which capabilities exchanged status is being tracked 1305. The endpoint then sends an exchange capabilities request to the hypervisor 1310. Again, for endpoint power on, capabilities may be exchanged with the hypervisor via the open session request rather than the exchange capabilities request. Once the exchange capabilities request has been forwarded to the hypervisor, processing is complete 1315. In this approach, the endpoint, instead of actively pushing the exchange capabilities request to the other endpoints, will wait for those other endpoints to initiate a communications flow, and will respond to that flow with an exchange capabilities required status.

By way of further explanation, described hereinbelow are various command structures for implementing the above-described, hypervisor-based communications facility in, for example, an IBM Power® computing system. The following discussion is provided by way of example only, and it should be understood that the claims presented herewith are not limited to the particular embodiment presented below.

TERMS AND CONCEPTS

As used herein, the following terms are employed:

Upstream—In this context, refers to a flow from the HMC to a partition based on the common view of a logically partitioned system that has partitions sitting on top of firmware (including HMC).

Downstream—In this context, refers to a flow from a partition to the HMC based on the common view of a logically partitioned system that has partitions sitting on top of firmware (including HMC).

Inbound—In the context of flows in and out of partitions and HMCs, refers to a flow into a partition or HMC. The term is to be interpreted as being from the perspective of the HMC or partition, not the hypervisor (HYP).

Outbound—In the context of flows in and out of partitions and HMCs, refers to a flow out of a partition or HMC. The term is to be interpreted as being from the perspective of the HMC or partition, not the HYP.

High Level Flows

This section discusses major interactions and events taking place between and in the subsystems involved in hypervisor pipe flows.

Two methods for packetizing response data associated with an upstream request from an HMC to a partition are possible. The first is a 'pull' method, whereby the source of the request, upon getting the response to the initial request, sends one or more GetRemainingResponseData flows to the target of the request until all of the associated response data has been retrieved. The second is a 'push' method, whereby the target of the request repeatedly sends the response flow for the request until all response data associated with the request is passed back to the source of the request.

Benefits of the pull method are that it allows the source of the initial request to retrieve data at its own pace.

Benefits of the push method are that it involves fewer overall flows through the hypervisor pipe, and it allows the target to immediately send all the response data back to the source and not have to deal with situations where the source simply abandons the remaining data. One potential drawback is that the target could get 'Busy' status back from the hypervisor if it sends several response flows back in quick succession. This would be aggravated if there are other partitions sending flows to the same HMC at the same time. Additionally, it's theoretically possible that a packet could get lost, meaning the HMC should be monitoring for such a situation and retry the initial request should it occur. With the pull method the HMC would simply retry the GetRemainingResponseData flow that failed.

OpenSession

This is an HMC message interface through which an HMC opens a session with and exchanges capabilities with the hypervisor.

One session can be opened for each attached HMC. There is no capability to open up multiple sessions for a single HMC.

In the parameters below, inbound and outbound are from the perspective of the HMC.

Open Session Request Parameters:

| Name | Description Of Contents |
|---|---|
| max inbound messages | Maximum number of outstanding inbound messages |
| max outbound messages | Maximum number of outstanding outbound events |
| number of capabilities bytes | Number of capabilities bytes below. |
| capabilities bytes | Each bit represents a capability. The HMC turns on bits representing capabilities it supports, the hypervisor turns off those bits representing capabilities it does not support. |

Open Session Response Parameters:

Same as request parameters, except 'max inbound messages' and 'max outbound messages' will contain the hypervisor's counter-proposals, which will always be less than or equal to what the HMC specified, and the capabilities bit mask will be the same as the mask that was passed in the request, except with bits representing capabilities not supported by the hypervisor turned off.

The maximum values that the hypervisor will counter-propose for 'max inbound events' and 'max outbound events' are 8 and 1, respectively. If the HMC specifies higher values, the hypervisor will counter-propose these values. If the HMC specifies lower values for some reason the hypervisor will honor them, but pipe throughput could be negatively impacted. Initial values of zero will result in Generic Error.

OpenSession Status Codes:

Passed back in common header. No command specific return code. Possible values are:

Good
InvalidOpcode
GenericError
InvalidState—an open session is issued while a session is open CloseSession This is an interface through which an HMC closes a command session with the hypervisor. There are no request or response parameters, and no session specific return codes.

ExchangeCapabilities:

This is an HMC message interface through which an HMC and the hypervisor exchange capabilities. This command may be sent multiple times for the duration/lifetime of the session. The command may immediately follow the OpenSession, and/or may be sent at some later point when the session is actually going to be used. The HMC and HYP must support the command as both the source and the target.

This command can be used to exchange capabilities if the HMC's or hypervisor's capabilities change as a result of a concurrent firmware update (presumably a non-concurrent firmware update will cause the session to close and an OpenSession to occur after the update). Both entities must verify each time a flow other than the ExchangeCapabilities is received for which it is a target that its current capabilities have been exchanged with the source. If they have not, the ExchangeCapabilities return code must be returned. If an event occurs that changed or may have changed the target's capabilities, the target must exchange capabilities with all sources again.

Request Parameters:

| Name | Description Of Contents |
|---|---|
| number of capabilities bytes | Number of capabilities bytes below. |
| capabilities bytes | Each bit represents a capability. The source turns on bits representing capabilities it supports, the target turns off those bits representing capabilities it does not support. |

Response Parameters:

Same as request parameters, except with bits representing capabilities not supported by the target turned off Return Codes:

Passed back in common header. No command specific return code. Possible values are:

Good

InvalidOpcode

GenericError

Hypervisor Pipe Request:

This is an HMC message interface through which an HMC communicates directly with a partition. The hypervisor acts as a simple pipe. It does not inspect the data to be piped to/from the partition. It copies the data areas (cargo) exactly with no modification.

This is a fully asynchronous command. When the HMC sends the command to the hypervisor, the hypervisor routes the cargo within this command to the specified partition. When a partition sends a flow to the hypervisor that targets an HMC, the hypervisor sends the command to the specified HMC along with the cargo from the partition.

All timing of these commands is the responsibility of the HMC and partition

Request Parameters:

| name | description of contents |
|---|---|
| source/target ID | HMC sets to target ID for outbound (from the HMC to HYP) flows. HYP sets to source ID for inbound (from HYP to the HMC) flows. |
| cargo size | Size of the cargo that follows, in bytes. This value cannot exceed 160 bytes for outbound flows that target a partition, and cannot exceed 1488 bytes for inbounds flows that target the HMC. |
| cargo | Cargo |

Ack Parameters:

| name | description of contents |
|---|---|
| return code | See 'return codes' below |
| length of additional return code data | Length of additional return code-specific data, if any, in bytes |
| additional return code data | Additional return code-specific data, if any |

Return Codes:

Success

Failure

Busy

InvalidParms

PipeClosed

MtuViolation

ExchangeCapabilities

Return Codes:

Success:

The request completed successfully.

Recovery: N/A

Failure:

The request fails and there is no further information.

Recovery: Retry the request. If the problem persists, begin standard analysis.

Bus:

The request was not performed because the request target (or possibly the hypervisor) is busy. This condition is expected to be temporary.

Recovery: Retry the procedure after a short delay. If the condition persists for an extended period (i.e. several minutes), there likely is a bug in the target or hypervisor.

InvalidParms:

The request was not performed because the command contained invalid or unrecognized parameters. An invalid target ID is an example of a condition that would result in this return code.

Recovery: None

PipeClosed:

The request was not performed because the pipe to the specified target is closed or not active. This may indicate that the target is powered off or in a failed state.

Recovery: Power on or IPL the target.

MtuViolation:

The specified cargo size exceeds the maximum transfer unit (MTU) size.

Additional Data:

| bytes | description |
|---|---|
| 0-3 | Supported MTU size |

Recovery: Retry with a supported cargo size

ExchangeCapabilities:

The request was not performed because the target's capabilities may have changed since the last time the capabilities were exchanged.

Recovery: Issue the ExchangeCapabilities request and then retry the failed request.

Logical Partition (LP) Events:
OpenSession:

This is an LP event interface through which a partition negotiates capabilities and max inbound/outbound values with the hypervisor during the session open protocol. The partition is always the source/initiator of the event, and the hypervisor is always the target.

This event may not be sent again after the session is open. The session management code monitors for the event ID and will reject the send if it occurs after the session is open.

In the parameters below, inbound and outbound are from the perspective of the partition.

Request Parameters:

| name | description of contents |
| --- | --- |
| event ID | Event code. |
| max inbound events | Maximum number of outstanding inbound events. |
| max outbound events | Maximum number of outstanding outbound events. |
| number of capabilities bytes | Number of capabilities bytes that follow. |
| capabilities bytes | Each bit represents a capability. The partition turns on bits representing capabilities it supports, the hypervisor turns off those bits representing capabilities it does not support. |

Response Parameters:

The response parameters are the same as the request parameters, except 'max inbound events' and 'max outbound events' will contain the hypervisor's counter-proposals, which will always be less than or equal to what the partition specified, and the capabilities bit mask will be the same as the mask that was passed in the request, except with bits representing capabilities not supported by the hypervisor turned off.

The maximum values that the hypervisor will counter-propose for 'max inbound events' and 'max outbound events' are 8 and 1, respectively. If the partition specifies higher values, the hypervisor will counter-propose these values. If the partition specifies lower values for some reason the partition will honor them, but pipe throughput could be negatively impacted. Initial values of zero will result in GenericError.

Return Codes:

Passed back in common header. No event specific return code. Possible values are:
  Good
  GenericError ExchangeCapabilities:

This is an LP event interface through which a partition and the hypervisor exchange capabilities after the session is open. Unlike OpenSession, this command may be sent multiple times for the duration/lifetime of the session. The partition and HYP must support the command as both the source and the target.

This command can be used to exchange capabilities if the partition's or hypervisor's capabilities change as a result of a concurrent firmware/code update (presumably a non-concurrent firmware/code update will cause the session to close and an OpenSession to occur after the update). Both entities must verify each time a flow other than the ExchangeCapabilities is received for which it is a target that its current capabilities have been exchanged with the source. If they have not, the ExchangeCapabilities return code must be returned. If an event occurs that changed or may have changed the target's capabilities, the target must exchange capabilities with all sources again.

Request Parameters:

| name | description of contents |
| --- | --- |
| event ID | Event code. |
| number of capabilities bytes | Number of capabilities bytes below. |
| capabilities bytes | Each bit represents a capability. The source turns on bits representing capabilities it supports, the target turns off those bits representing capabilities it does not support. |

Response Parameters:

Same as request parameters, except with bits representing capabilities not supported by the target turned off.

Return Codes:

Passed back in common header. No event specific return code. Possible values are:
  Good
  GenericError HypervisorPipeRequestInbound:

This is an LP event interface through which the hypervisor transports a hypervisor pipe flow to a partition designated as the target of the flow. The flow is inbound from the perspective of the partition.

This is an asynchronous event. The ACK merely acknowledges that the partition received the event and intends to process it. Only errors that prevent the partition from eventually processing the request should be reported in the ACK. In other words, if the partition will never process the request because of something like invalid command parms, the partition should ACK the HypervisorPipeRequestInbound with a bad return code such as InvalidParms. Errors that occur while processing of the request, after the HypervisorPipeRequestInbound is ACKed, should be reported back to the source entity via the cargo in the HypevisorPipeRequestOutbound event.

Request Parameters:

| name | description of contents |
| --- | --- |
| event ID | Event code. |
| source ID | Source identification. |
| cargo size | Size of the cargo that follows, in bytes |
| cargo | Cargo |

Ack Parameters:

| name | description of contents |
| --- | --- |
| return code | See 'return codes' below. |
| length of additional return code data | Length of additional return code-specific data, if any |
| additional return code data | Additional return code-specific data, if any |

Return Codes:
- Success
- Failure
- InvalidParms
- ExchangeCapabilities

HypervisorPipeRequestOutbound

This is an LP event interface through which a partition initiates a hypervisor pipe flow as the source of the flow. The flow is outbound from the perspective of the partition. The hypervisor transports the cargo to the target entity.

This is an asynchronous event. The ACK merely acknowledges that the hypervisor received the event and intends to forward it to the target. Only errors that prevent the hypervisor from forwarding the request to the target will be reported in the ACK.

The partition can specify whether to DMA the cargo or whether it is included in this event. The partition may decide to DMA only if the cargo is too large for the event or DMA all the time, although DMA is less efficient than including cargo in the event itself when the cargo is small enough to fit in the event. If DMA is specified ('DMA required'=1), the partition must specify an array of logical-real-address/length pairs describing the cargo data buffer. Each entry describes a single, contiguous, real address range. This range may not span pages. For example, if the partition allocates a cargo buffer from system heap that is 4000 bytes long and crosses a page boundary, the partition must pin the storage and create two logical-real-address/length entries in the buffer list. Furthermore, the partition must not free the buffer containing the data to be DMAed until the hypervisor ACKs the event.

Request Parameters:

| name | description of contents |
|---|---|
| event ID | Event identification |
| target ID | Target identification. |
| DMA required | 0 = cargo is contained in this event, 1 = cargo must be DMAed from partition |
| cargo size | Size of cargo, in bytes. Should reflect the size of the cargo in the cargo field if 'DMA required' field is 0, or the size of the cargo to DMA if 'DMA required' field is 1. If 'DMA required' = 0, the max cargo size is 176 bytes minus the size of the request parameters (176 − 16 = 160). If 'DMA required' = 1, the max cargo size is 1472 bytes. If 'DMA required' = 1, then remaining request parameters are as shown below: |
| buffer list size | Size, in bytes, of the buffer list. See below for format of buffer list. Valid only when 'DMA required' is set. |
| buffer list address | Real address (logical-real) of the buffer list in partition address space. The buffer list must be pinned and reside in contiguous, real memory. It may not span pages. See below for format of buffer list. Valid only when 'DMA required' is set. If 'DMA' required = 0, then remaining request parameters are as shown below: |
| cargo | Cargo |

Buffer List:

The buffer list is an array of address/length pairs, where each pair describes a chunk of contiguous, real buffer space. If the buffer resides in real memory that is not contiguous, multiple entries are required.

| name | description of contents |
|---|---|
| buffer list size | Size, in bytes, of buffer list, including this field. Following fields repeat for each address/length pair: |
| address | Real address (logical-real), in partition address space, of pinned, contiguous, real memory from which to copy a chunk of cargo. The buffer cannot span pages. |
| size | Size, in bytes, of buffer 'chunk' addressed by 'address' field. |

Ack Parameters:

| name | description of contents |
|---|---|
| return code | See 'return codes' below. |
| size of additional return code data | Size, in bytes, of additional return code-specific data, if any. |
| additional return code data | Additional return code-specific data, if any |

Return Codes:
- Success
- Failure
- Busy
- InvalidParms
- PipeClosed
- MtuViolation
- ExchangeCapabilities
- BufferNotPinned
- MemorySue Return Codes The LP event return codes are the same as those for the HMC commands, plus the following LP event unique ones.

BufferNotPinned

The request was not performed because a buffer specified by the partition from/to which to DMA data was not pinned.

Recovery: Change the partition code to pin the buffer. This is most likely a code error in the partition.

MemorySue

The request was not performed because a memory SUE occurred accessing partition memory.

Recovery: None.

HMC-i5/OS Commands:

This section lists the commands that flow between HMC and partitions as cargo in the hypervisor pipe flows. It should be noted that the material in this section provides examples and guidelines for those architecting the cargo that flows through the hypervisor pipe.

In the following sections, request parameters are what appear in the cargo field of the hypervisor pipe flow (source transport primitive) that initiates the request, and the response parameters are what appear in the cargo field of the hypervisor pipe flow (target transport primitive) that represents the response to the original request.

Command Class, Command Code:

In the command definitions below, the 'command class' value represents a particular class of commands, such as all those related to a particular function (i.e., session management). The 'command code' value represents a particular command within that class. The class value must be unique across all classes. The code value must be unique only within that class.

The command code for the response associated with a particular request is the command code for the request with the high order bit on.

ExchangeCapabilities

This is an exchange through which two endpoints, source and target, exchange capabilities defining expectations and behaviors related to a hypervisor pipe session between the two.

The max inbounds/outbounds can be negotiated to whatever the two endpoints desire. The inbounds/outbounds are to be interpreted as from the standpoint of the source of the request. The source of the ExchangeCapabilities request should set the max inbounds to the number of requests it can be processing at a time and leave the max outbounds set to zero. The target should set its pacing of outbound requests to a value less than or equal to the max inbounds value specified by the source, and set the max outbounds value to the number of requests it can be processing at a time. The source should then set its pacing of outbound requests to a value less than or equal to the max outbounds value specified by the target. Assuming as an example that max inbounds and outbounds are both negotiated to a value of four, this means the HMC can expect the partition to support up to four upstream requests outstanding at a time, and the partition can expect the HMC to support up to four downstream requests outstanding at a time. A request flow is considered outstanding if there is a corresponding response flow that the source of the request flow has not received yet. A request flow for which there is no corresponding response flow over the general purpose hypervisor pipe is never considered outstanding from the standpoint of the max inbounds/outbounds.

If an endpoint has no identifiable limit on how many outstanding inbounds it can handle, as might be the case if the endpoint dynamically allocates internal messages and control blocks rather than pre-allocating them, the endpoint may set the value in the exchange capabilities corresponding to the max outstanding inbounds it can support to a special value indicating that there is no limit (such as all 0xF). The other endpoint can then send as many hypervisor pipe flows to that target as it desires with no pacing, but should be prepared to handle occasional Busy return codes from the target for cases where the target may temporarily be unable to acquire necessary resources (such as messages, control block space, etc.).

Request Parameters:

| name | description of contents |
| --- | --- |
| command class | An indication of the command class. |
| command code | An indication of the command code. |
| response required | A bit that indicates whether the source of this flow expects a response flow from the target. |
| request ID | Token that ties a 'request' hypervisor pipe flow to the corresponding 'response' hypervisor pipe flow. The target of the request simply passes the value back in the response flow. The source of the request associates the value from the response flow with the corresponding request. |
| max inbound events | Maximum number of outstanding inbound events. |
| max outbound events | Maximum number of outstanding outbound events. |
| number of capabilities bytes | Number of capabilities bytes below. |
| capabilities | Each bit represents a capability. The source turns on bits representing capabilities it supports, the target turns off those bits representing capabilities it does not support. |

Response Parameters:

| name | description of contents |
| --- | --- |
| command class | An indication of the command class. |
| command code | And indication of the command code. |
| return code | See 'return codes' below |
| request ID | The request ID value from the associated request |
| max inbound events | Target's counterproposal to source's proposal |
| max outbound events | Target's counterproposal to source's proposal |
| number of capabilities bytes | Number of capabilities bytes below. |
| capabilities | Same as in the request parameters, except with bits representing capabilities not supported by the target turned off |

Return Codes:
  Success
  Failure
  InvalidParms
  PresentStateProhibits
  Busy

CancelRequest

This is an exchange through which the source/initiator of a prior request flow that is still outstanding can cancel that request. The intent is to use this flow in cases where the request timer maintained by the source/initiator expires, or the source simply doesn't want to see the response for some reason. A positive response (success return code) flow from the target of this request means the target will not send a response flow for the specified request ID, and the specified request ID can be reused by the initiator of the request. A negative response (non-success return code) from the target means the initiator may still get a response flow for the specified request ID, and the request ID cannot be reused until the response flow is received.

Request Parameters:

| name | description of contents |
| --- | --- |
| command class | An indication of the command class. |
| command code | An indication of the command code. |
| response required | A bit that indicates whether the source of this flow expects a response flow from the target. |
| request ID | Token that ties a 'request' hypervisor pipe flow to the corresponding 'response' hypervisor pipe flow. The target of the request simply passes the value back in the response flow. The source of the request associates the value from the response flow with the corresponding request. |
| request ID to cancel | The request ID associated with the prior request for which cancellation is being requested |

Response Parameters:

| name | description of contents |
| --- | --- |
| command class | An indication of the command class. |
| command code | An indication of the command code. |
| return code | See 'return codes' below |
| request ID | The request ID value from the associated request |
| request ID to cancel | The request ID associated with the prior request for which cancellation is being requested |

Return Codes:
- Success
- Failure
- InvalidParms
- PresentStateProhibits
- RequestCannotBeCancelled
- Busy FunctionX Request This section illustrates the command definitions for a fictitious 'function X' request that would be typical of a hypervisor pipe flow that originates at the HMC and requires packetization of response data using the 'pull' method. The request is an upstream flow. The response is a downstream flow.

Request Parameters:

| name | description of contents |
| --- | --- |
| command class | An indication of the command class. |
| command code | An indication of the command code. |
| response required | A bit that indicates whether the source of this flow expects a response flow from the target. |
| request ID | Token that ties a 'request' hypervisor pipe flow to the corresponding 'response' hypervisor pipe flow. The target of the request simply passes the value back in the response flow. The source of the request associates the value from the response flow with the corresponding request. |
| additional data size | Size of any additional data associated with this request. |
| additional data | Additional data associated with this request. |

Response Parameters:

| name | description of contents |
| --- | --- |
| command class | An indication of the command class. |
| command code | And indication of the command code. |
| return code | See 'return codes' below |
| request ID | The request ID value from the associated request. |
| response data key | A token that the target of this response passes back in the request for remaining response data, and that the source of this response then uses to identify which response data is being requested and where in the overall response data to continue returning data. The value is a simple token to the target of the response, but may encode a byte offset into a buffer or an index into a list for the source of the response. |
| response data sequence number | The sequence number associated with this packet of response data. This value allows the target of this response to detect packets coming in out of order. This value is one-based (starts with one). |

| name | description of contents |
| --- | --- |
| total response data size | Total size of response data associated with this response, in bytes. |
| remaining response data size | Size of response data associated with this response that remains to be transferred, in bytes. |
| size of response data in this command | Size of response data in this response flow. |
| response data | Actual response data contained in this response flow. |

Return Codes:
- Success
- Failure
- InvalidParms
- PresentStateProhibits
- ExchangeCapabilities
- Busy GetRemainingResponseData Request This is a request that flows from one end point to the other over the hypervisor pipe to initiate the transfer of additional response data associated with an earlier request. Each class of commands that require packetization of response data using the pull method should define a command code for this command to facilitate routing of the request to the proper component within the target.

Packetization of response data could also be achieved my sending multiple response flows over the hypervisor pipe (the push method). That is, the target of the request sends multiple responses until there is no more response data. The source of the request (target of the responses) knows when the last one is received because the 'remaining response data size' field is zero.

Request Parameters:

| name | description of contents |
| --- | --- |
| command class | An indication of the command class. |
| command code | An indication of the command code. |
| response required | A bit that indicates whether the source of this flow expects a response flow from the target. |
| request ID | Token that ties a 'request' hypervisor pipe flow to the corresponding 'response' hypervisor pipe flow. The target of the request simply passes the value back in the response flow. The source of the request associates the value from the response flow with the corresponding request. |
| response data key | Response data key from the most recent response flow relating to data being retrieved |

Response Parameters:

| name | description of contents |
| --- | --- |
| command class | An indication of the command class. |
| command code | An indication of the command code. |

-continued

| name | description of contents |
|---|---|
| return code | See 'return codes' below |
| request ID | The request ID value from the associated request |
| response data key | A token that the target of this response passes back in the request for remaining response data, and that the source of this response then uses to identify which response data is being requested and where in the overall response data to continue returning data. The value is a simple token to the target of the response, but may encode a byte offset into a buffer or an index into a list for the source of the response. |
| response data sequence number | The sequence number associated with this packet of response data. This value allows the target of this response to detect packets coming in out of order. This value is one-based (starts with one). |
| total response data size | Total size of response data associated with data being retrieved, in bytes. |
| remaining response data size | Size of response data associated with data being retrieved that remains to be collected, in bytes. |
| size of response data in this command | Size of response data in this response flow. |
| response data | Actual response data contained in this response flow. |

Return Codes:
    Success
    Failure
    InvalidParms
    PresentStateProhibits
    ExchangeCapabilities
    InvalidResponseDataKey
    Busy
Return Codes
Success
    The request completed successfully.
    Recovery: N/A
Failure
    The request failed and there is no further information.
    Recovery: Retry the request. If the problem persists, begin standard problem analysis procedures.
InvalidParms
    The target detected invalid data/parameters in the command, such as an unrecognized command class or command code.
    Recovery: None. Probably a bug.
PresentStateProhibits
    The present state of the target prohibits processing of this command.
    Recovery: Get the target into a state where it can process the command.
ExchangeCapabilities
    The request was not performed because the target's capabilities may have changed since the last time the capabilities were exchanged.
    Recovery: The source should issue the ExchangeCapabilities command and then retry the request.
InvalidResponseDataKey
    The request to retrieve additional response data was not processed by the target because the response data key value provided in the command was not valid.
    Recovery: None.
RequestCannotBeCancelled
    The specified request cannot be cancelled. It may be in flight or it may have progressed to a point where cancellation is no longer possible. The response flow will be forthcoming.
    Recovery: None.
Busy
    The request was not performed because the request target is busy. This condition is expected to be temporary.
    Recovery: Retry the procedure after a short delay. If the condition persists for an extended period (i.e. several minutes), there likely is a bug in the target and IBM service should be contacted.
Design Details:
    Command Flow Control and Pacing
Partition-HYP LP Event Session HYP must provide an ACK message for each Hypervisor-PipeRequestInbound sent to a partition. HYP will maintain a separate pool of pre-allocated messages for each partition that actually exists (not the max architected partitions). When partitions are created or deleted, their message pools and messages will be created and deleted as well. Having a separate pool per partition together with immediately ACKing with Busy status upstream flows to targets with empty message pools prevents one partition that doesn't ACK events in a timely fashion from impacting throughput to other partitions. ACKing with Busy status an upstream request from an HMC to a partition whose ACK message pool is empty puts the burden of handling temporary busy periods and permanent hangs in the target partition on the HMC. The HMC should view a Busy return code as a temporary condition, and periodically retry the upstream request until either it works or a reasonable amount of time has elapsed with continued Busy in which case the HMC might assume the target is hung.

The receipt of ACKs from partitions will not be timed by HYP. A partition that is not ACKing requests likely isn't accepting new ones either, so freeing ACK messages by timeout so we can send additional requests is likely futile.

HYP will signal hypervisor pipe request events to partitions asynchronously. This means the HYP task is not blocked until receipt of the ACK, and multiple events can be outstanding to the partition at a time. Since the number of events that can be outstanding is limited by the number of ACK messages in the pool, HYP will agree with any max inbounds value proposed by the partition that is equal to or less than the number of pre-allocated messages per partition. If the partition proposes more than that, HYP will reduce the number to the configured number in the OpenSession response. HYP will pace the sending of upstream requests to the partitions so as never to exceed the negotiated max inbounds value. HYP will always set the max outbounds value to one in the OpenSession response because HYP will be single threaded in processing of the downstream HypervisorPipeRequestOutbound event flows from partitions thus making a value greater than one of no value.

Partitions should ACK inbound flows as quickly as possible so ACK messages will be returned to the appropriate pools in HYP quickly. This will maximize pipe throughput. The longer it takes a partition to ACK an inbound flow, the greater the chance that an ACK message pool will be exhausted, at which time HYP will start ACKing requests targeted to the lethargic partition back to the source with Busy status.

Rebooting a partition that is hung and not ACKing upstream requests will force all outstanding ACK messages back to HYP HMC-HYP Command Session HYP handling of the sessions between HMCs and HYP is similar to that for sessions between partitions and HYP as described in the previous section.

HYP must provide an ACK message for each HypervisorPipeRequest command it sends to the HMC. HYP will maintain a pool of messages for each HMC that is connected. Having a separate pool per HMC together with immediately ACKing with Busy status downstream flows to target HMCs with empty message pools prevents one HMC that doesn't ACK events in a timely fashion from impacting throughput to other HMCs. ACKing with Busy status a downstream request from a partition to an HMC whose ACK message pool is empty puts the burden of handling temporary busy periods and permanent hangs in the target HMC on the partition. The partition should view a Busy return code as a temporary condition, and periodically retry the downstream request until either it works or a reasonable amount of time has elapsed with continued Busy in which case the partition might assume the target is hung.

HYP will pace the sending of downstream requests to the HMCs so as never to exceed the negotiated max inbounds value for a given HMC, which will be negotiated to a maximum (for example) of eight (HYP will honor a lower value if the HMC proposes a value less than eight initially). HYP will always set the max outbounds value to one in the OpenSession response because HYP will be single threaded in processing of the upstream HypervisorPipeRequest command flows from HMCs thus making a value greater than one of no value.

The receipt of ACKs from HMCs will not be timed by HYP. An HMC that is not ACKing requests likely isn't accepting new ones either, so freeing ACK messages by timeout so additional requests can be sent is likely futile.

HMCs should ACK inbound flows as quickly as possible so ACK messages will be returned to the appropriate pools in HYP quickly. This will maximize pipe throughput. The longer it takes an HMC to ACK an inbound flow, the greater the chance that an ACK message pool will be exhausted, at which time HYP will start ACKing requests targeted to the lethargic HMC back to the source with Busy status.

Rebooting or disconnecting an HMC that is hung and not ACKing downstream requests will force all outstanding ACK messages back to HYP.

HMC-Partition Session

The sessions described above comprise the higher level sessions between endpoints (HMCs and partitions), and these sessions are managed and controlled in much the same way as the underlying sessions. A capabilities exchange allows the two endpoints to negotiate max inbound/outbound values, and determine each others' support of the specific capabilities defined in the capabilities bytes.

To prevent the two endpoints of a hypervisor pipe session from getting out of sync relative to capabilities and/or max inbounds/outbounds, the destination of any hypervisor pipe flow that is not an ExchangeCapabilities command must check if the source has exchanged capabilities with the destination since the destination experienced an event that could have changed its capabilities (such as an IPL during which code updates were applied, or a concurrent firmware update). If not, the destination must return the ExchangeCapabilities return code in the response flow.

When the source of a request receives the ExchangeCapabilities return code, it must issue an ExchangeCapabilities command to the destination, and then may resend the original request that failed.

The max inbounds/outbounds can be negotiated to whatever the two endpoints desire. The inbounds/outbounds are to be interpreted as from the standpoint of the source of the request. The source of the ExchangeCapabilities request should set the max inbounds to the number of requests it can be processing at a time and leave the max outbounds set to zero. The target should set its pacing of outbound requests to a value less than or equal to the max inbounds value specified by the source, and set the max outbounds value to the number of requests it can be processing at a time. The source should then set its pacing of outbound requests to a value less than or equal to the max outbounds value specified by the target. Assuming as an example that max inbounds and outbounds are both negotiated to a value of four, this means the HMC can expect the partition to support up to four upstream requests outstanding at a time, and the partition can expect the HMC to support up to four downstream requests outstanding at a time. Outstanding means the source of a request flow has not yet received the corresponding response flow from the source.

If an endpoint has no identifiable limit on how many outstanding inbounds it can handle, as might be the case if the endpoint dynamically allocates internal messages and control blocks rather than pre-allocating them, the endpoint may set the value in the exchange capabilities corresponding to the max outstanding inbounds it can support to a special value indicating that there is no limit (such as all 0xF). The other endpoint can then send as many hypervisor pipe flows to that target as it desires with no pacing, but should be prepared to handle occasional Busy return codes from the target for cases where the target may temporarily be unable to acquire necessary resources (such as messages, control block space, etc.).

It should be noted that adhering to the max inbounds/outbounds values negotiated between the HMCs and partitions does not guarantee that the source of a request flow over such a session avoids Busy return codes. A Busy return code could be generated by HYP in the HypervisorPipeRequest request flow ACK if the ACK message pool for the target is empty.

Instrumentation

HYP should provide some amount of instrumentation to track things like the number of Busy ACKs generated and the targets that caused them, the number of send failures, the average amount of time a flow is in the pipe (for both upstreams and downstreams), the total number of upstream and downstream flows, etc.

Busy Return Code Handling

The recommended handling in endpoints of busy return codes from HYP is to retry the outbound flow after a short delay and repeat until a reasonable amount of time has elapsed or the outbound flow finally succeeds. Reasonable may vary based on the command or request being sent.

ExchangeCapabilities Handling

The recommended handling of the ExchangeCapabilities return code from HYP or other endpoints is to issue the ExchangeCapabilities request and then retry the request that was rejected. Alternatively, endpoints could choose to issue the ExchangeCapabilities request and abort rather than retry the rejected request. The user would then have to manually retry the failed request. This alternative may be attractive if retrying the failed request automatically is difficult. If this alternative is implemented, be aware that although capability changes will be rare, partition power off/ons may occur relatively frequently and will cause partitions to return the ExchangeCapabilities return code until capabilities have been exchanged with the source/initiator of the request again.

However, measures can be taken to reduce the likelihood of an ExchangeCapabilities return code occurring.

One implementation (option 1) in the endpoints is to issue the ExchangeCapabilities request to all active endpoints each time an event occurs that could have changed the capabilities, such as a concurrent code update (or removal) or an endpoint power on. With this implementation, the endpoints cache the capabilities of all other possible endpoints and attempt to keep the cached capabilities current by asynchronously notifying other endpoints when something occurs that may change their capabilities. This approach does not completely prevent the ExchangeCapabilities return code, as flows could be in flight when capabilities are being exchanged, but it does reduce the chances of one occurring to a level sufficiently low such that aborting the rejected request as opposed to automatically retrying it would be an acceptable option.

Another implementation (option 2) in the endpoints that would reduce the likelihood of the ExchangeCapabilities return code occurring is to issue the ExchangeCapabilities request before each request to an endpoint. With this approach it is not necessary to cache capabilities. Capabilities are queried real-time only when needed. Like option 1, this approach does not completely eliminate the possibility of getting the ExchangeCapabilities return code, but it reduces the chances to a low enough level that aborting the rejected request rather than automatically retrying would be acceptable. It should be noted that this approach may significantly increase the number of flows between the endpoints. In the simplest form, it would double the number of flows. If there are certain user tasks that involve multiple flows to a particular endpoint to complete the task, the initiating endpoint could issue the ExchangeCapabilities to the target endpoint once per user task, rather than once for each request flow, thus reducing the total number of ExchangeCapabilities flows.

For both options described above, each endpoint must track the other endpoints with which it has exchanged capabilities, and verify for each flow that is not an ExchangeCapabilities for which it is a target that it has exchanged its current capabilities with the source of that flow. If an event occurs that changed or may have changed its capabilities, it must exchange its new or potentially new capabilities with other endpoints again.

HYP will initiate an ExchangeCapabilities request over all active general purpose hypervisor pipe HMC sessions and LP event sessions each time an event occurs that may change its capabilities (i.e. concurrent firmware update). Similarly, endpoints should initiate an ExchangeCapabilities request with HYP each time an event occurs that may change its capabilities concurrently (i.e. concurrent code update). Thus, endpoints must support ExchangeCapabilities flows with HYP both as the source (i.e. when the endpoint goes through concurrent code update) and as target (i.e. when HYP goes through a concurrent firmware update). Capabilities are exchanged when an HMC or partition powers on via the OpenSession commands.

Further details on shared memory partition data processing systems are provided in the following, co-filed patent applications, the entirety of each of which is hereby incorporated herein by reference: "Hypervisor Page Fault Processing in a Shared Memory Partition Data Processing System", U.S. Ser. No. 12/403,408; "Managing Assignment of Partition Services to Virtual Input/Output Adapters", U.S. Ser. No. 12/403,416; "Automated Paging Device Management in a Shared Memory Partition Data Processing System", U.S. Ser. No. 12/403,426; "Dynamic Control of Partition Memory Affinity in a Shared Memory Partition Data Processing System", U.S. Ser. No. 12/403,440; "Transparent Hypervisor Pinning of Critical Memory Areas in a Shared Memory Partition Data Processing System", U.S. Ser. No. 12/403,447; "Shared Memory Partition Data Processing System with Hypervisor Managed Paging", U.S. Ser. No. 12/403,459; "Controlled Shut-Down of Partitions Within a Shared Memory Partition Data Processing System", U.S. Ser. No. 12/403,472; and "Managing Migration of a Shared Memory Logical Partition from a Source System to a Target System", U.S. Ser. No. 12/403,485.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 14:
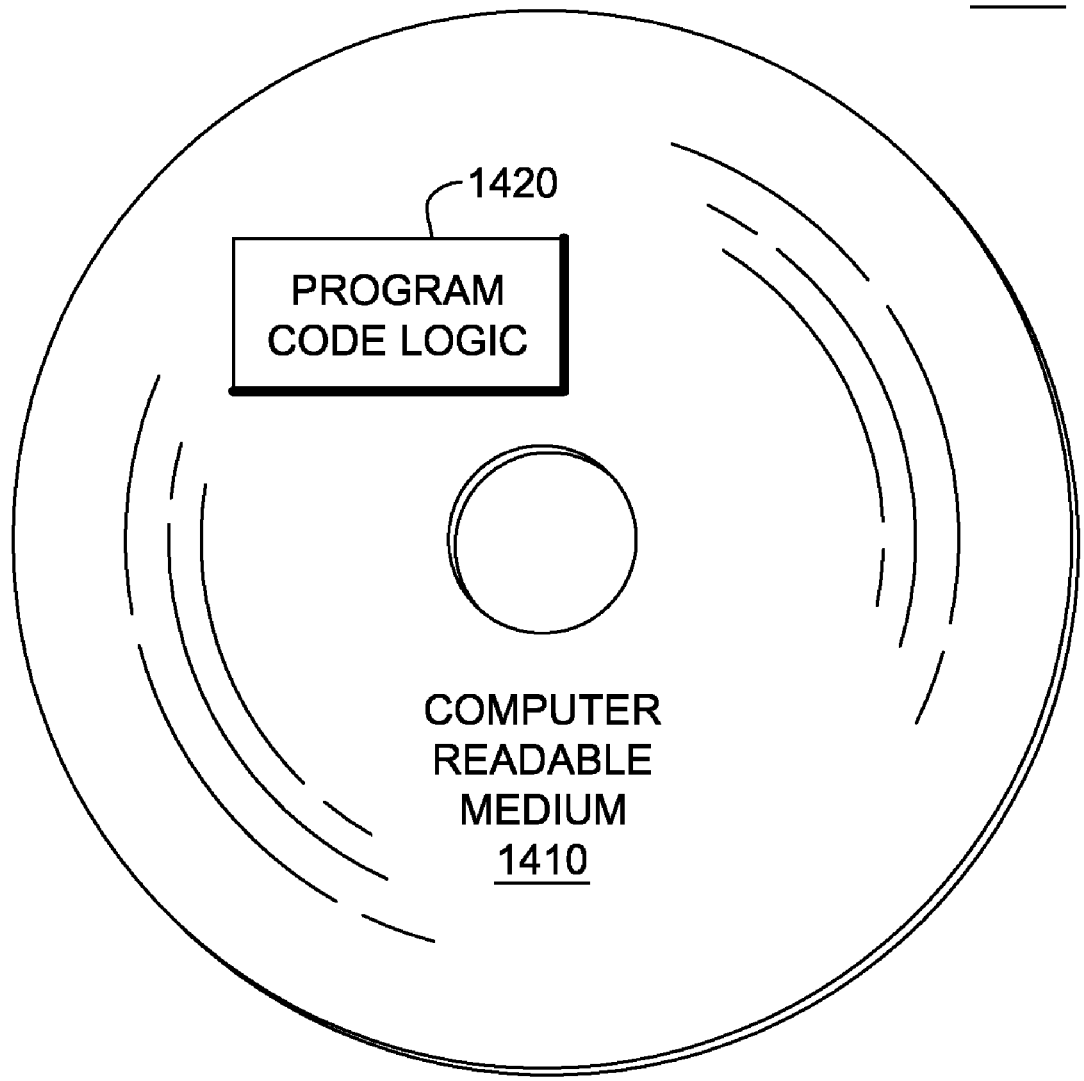
FIG. 14 depicts one embodiment of a computer program product incorporating one or more aspects of the present invention.

One example of an article of manufacture or a computer program product incorporating one or more aspects of the present invention is described with reference to FIG. 14. A computer program product 1400 includes, for instance, one or more computer-readable media 1410 to store computer readable program code means or logic 1420 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Although various embodiments are described above, these are only examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code can be used, which includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of communicating between a hardware management console and a logical partition of a logically partitioned data processing system, the method comprising:
utilizing a hypervisor pipe in directly communicating between the hardware management console and the logical partition, the hypervisor pipe comprising a point-to-point, logical communications session through a hypervisor of the data processing system between the hardware management console and the logical partition, the utilizing comprising:
packaging by a source endpoint a request or a response of the source endpoint as cargo in a generic transport primitive to be forwarded via the hypervisor pipe, the source endpoint being one of the hardware management console or the logical partition of the data processing system, wherein the hardware management console is a user interface for partition management; and
forwarding the generic transport primitive directly from the source endpoint to a target endpoint via the hypervisor pipe, wherein the forwarding comprises receiving by the hypervisor the generic transport primitive packaged at the source endpoint and forwarding the cargo of the generic transport primitive to the target endpoint, the cargo comprising the request or the response of the source endpoint, and wherein the receiving and the forwarding by the hypervisor are absent inspecting or parsing of the cargo by the hypervisor, and the target endpoint is the other one of the logical partition or the hardware management console of the data processing system.

2. The method of claim 1, wherein the received generic transport primitive is a source transport primitive, and wherein the forwarding comprises building by the hypervisor a target transport primitive, the building comprising copying the cargo of the source transport primitive into the target transport primitive, and forwarding the target transport primitive from the hypervisor to the target endpoint.

3. The method of claim 2, wherein the receiving comprises receiving the source transport primitive into a receive buffer at the hypervisor and the building comprises building the target transport primitive in a target message buffer at the hypervisor, the target message buffer being from a pool of message buffers at the hypervisor associated with the target endpoint.

4. The method of claim 3, wherein the building further comprises determining whether a target message buffer is available in the pool of message buffers associated with the target endpoint, and if so, obtaining the target message buffer from the pool of message buffers associated with the target endpoint and building the target transport primitive in the obtained target message buffer, the building comprising copying by the hypervisor the cargo comprising the request or the response of the source endpoint from the receive buffer into the target message buffer absent inspecting or parsing of the cargo.

5. The method of claim 2, wherein forwarding the target transport primitive to the target endpoint comprises asynchronously forwarding the target transport primitive to the target endpoint.

6. The method of claim 2, wherein the building comprises verifying by the hypervisor that size of the cargo in the source transport primitive is within an acceptable size, and verifying that a target endpoint identification provided with the source transport primitive is valid.

7. The method of claim 2, wherein the target endpoint, upon receipt of the target transport primitive, determines whether the cargo thereof contains a valid request, and if so, processes the request and returns to the source endpoint via the hypervisor a response as cargo within another generic transport primitive, and if the cargo received with the target transport primitive is other than a valid request, the target endpoint determines whether the cargo contains a valid response, and if so, processes the response.

8. The method of claim 1, further comprises opening the point-to-point, logical communications session between the hardware management console and the logical partition, wherein the opening of the communications sessions occur prior to the packaging and the forwarding of the generic transport primitive.

9. The method of claim 8, further comprising automatically exchanging communication capabilities between the logical partition, the hypervisor and the hardware management console responsive to an event which changed capabilities at the hypervisor or an endpoint of the logically partitioned data processing system, the endpoint being one of the logical partition or the hardware management console, wherein exchanging capabilities between the logical partition and the hardware management console comprises one of:
(i) packaging an exchange capabilities request at the logical partition as cargo in a generic transport primitive and forwarding the generic transport primitive from the logical partition to the hardware management console via the hypervisor absent inspecting or parsing of the cargo by the hypervisor; or (ii) initiating by the hypervisor an exchange capabilities request and forwarding the exchange capabilities request from the hypervisor to the logical partition.

10. A logically partitioned data processing system comprising:
   at least one processor comprising at least one logical partition;
   at least one hardware management console, each hardware management console being a user interface for partition management; and
   a hypervisor interfacing the at least one hardware management console and the at least one logical partition, and comprising a communications facility for communicating between one hardware management console of the at least one hardware management console and one logical partition of the at least one logical partition through the hypervisor, the communications facility comprising a hypervisor pipe between the one hardware management console and the logical partition, the hypervisor pipe comprising a point-to-point, logical communications session through the hypervisor between the one hardware management console and the one logical partition, the communicating including:
      packaging by a source endpoint a request or a response of the source endpoint as cargo in a generic transport primitive to be forwarded via the hypervisor pipe, the source endpoint being the hardware management console of the at least one hardware management console or the logical partition of the at least one logical partition; and
      forwarding the generic transport primitive directly from the source endpoint to a target endpoint via the hypervisor pipe, wherein the forwarding comprises receiving by the hypervisor the generic transport primitive packaged at the source endpoint and forwarding the cargo of the generic transport primitive to the target endpoint, the cargo comprising the request or the response, and wherein the receiving and the forwarding by the hypervisor are absent inspecting or parsing of the cargo by the hypervisor, and the target endpoint is the other one of the one logical partition of the at least one logical partition or the one hardware management console of the at least one hardware management console.

11. The logically partitioned data processing system of claim 10, wherein the received generic transport primitive is a source transport primitive, and wherein the forwarding comprises building by the hypervisor a target transport primitive, the building comprising copying the cargo of the source transport primitive into the target transport primitive, and forwarding the target transport primitive from the hypervisor to the target endpoint.

12. The logically partitioned data processing system of claim 11, wherein the hypervisor further includes a pool of message buffers associated with the target endpoint, and wherein the hypervisor receives the generic transport primitive into a receive buffer and builds the target transport primitive in a target message buffer, the target message buffer being one message buffer retrieved from the pool of message buffers associated with the target endpoint.

13. The logically partitioned data processing system of claim 12, wherein the building of the target transport primitive further includes determining whether a target message buffer is available in the pool of message buffers associated with the target endpoint, and if so, obtaining the target message buffer from the pool of message buffers associated with the target endpoint and building the target transport primitive in the obtained target message buffer, the building including copying by the hypervisor the cargo comprising the request or the response of the source endpoint from the receive buffer into the target message buffer absent inspecting or parsing of the cargo.

14. The logically partitioned data processing system of claim 11, wherein forwarding the target transport primitive to the target endpoint comprises asynchronously forwarding by the hypervisor the target transport primitive to the target endpoint.

15. The logically partitioned data processing system of claim 10, wherein the at least one processor comprises multiple logical partitions, and wherein the at least one hardware management console connects to the hypervisor of the logically partitioned data processing system across a flexible service processor coupled to the hypervisor, and the communications facility further comprises a respective hypervisor pipe between each hardware management console of the at least one hardware management console and a respective logical partition of the at least one logical partition.

16. The logically partitioned data processing system of claim 15, wherein the communications facility is configured to automatically exchange capabilities between the logical partitions, the hypervisor and the at least one hardware management console responsive to an event which changes capabilities at the hypervisor with an endpoint of the logically partitioned data processing system, the endpoint being the one logical partition of the at least one logical partition or the one hardware management console of the at least one hardware management console.

17. An article of manufacture comprising:
   at least one non-transitory computer-readable medium having computer-readable program code logic to facilitate communication between a hardware management console and a logical partition of a logically partitioned data processing system, the computer-readable program code logic when executing on a processor performing:
      utilizing a hypervisor pipe in directly communicating between the hardware management console and the logical partition, the hypervisor pipe comprising a point-to-point, logical communications session through a hypervisor of the data processing system between the hardware management console and the logical partition the utilizing comprising:
         packaging by a source endpoint a request or a response of the source endpoint as cargo in a generic transport primitive to be forwarded via the hypervisor pipe, the source endpoint being one of the hardware management console or the logical partition of the data processing system, wherein the hardware management console is a user interface for partition management; and
         forwarding the generic transport primitive directly from the source endpoint to a target endpoint via the hypervisor pipe, wherein the forwarding comprises receiving by the hypervisor the generic transport primitive packaged at the source endpoint and forwarding the cargo of the generic transport primitive to the target endpoint, the cargo comprising the request or the response of the source endpoint, and wherein the receiving and the forwarding by the hypervisor are absent inspecting or parsing of the cargo by the hypervisor, and the target endpoint is the other one of the logical partition or the hardware management console of the data processing system.

18. The article of manufacture of claim 17, wherein the received generic transport primitive is a source transport primitive, and wherein the forwarding comprises building by the hypervisor a target transport primitive, the building comprising copying the cargo of the source transport primitive into the target transport primitive, and forwarding the target transport primitive from the hypervisor to the target endpoint.

19. The article of manufacture of claim 18, wherein the receiving comprises receiving the source transport primitive into a receive buffer at the hypervisor and the building comprises building the target transport primitive in a target message buffer at the hypervisor, the target message buffer being from a pool of message buffers at the hypervisor associated with the target endpoint.

20. The article of manufacture of claim 19, wherein the building further comprises determining whether a target message buffer is available in the pool of message buffers associated with the target endpoint, and if so, obtaining the target message buffer from the pool of message buffers associated with the target endpoint and building the target transport primitive in the obtained target message buffer, the building comprising copying by the hypervisor the cargo comprising the request or the response of the source endpoint from the receive buffer into the target message buffer absent inspecting or parsing of the cargo.

* * * * *